(12) United States Patent
Ikenoue et al.

(10) Patent No.: US 6,738,491 B1
(45) Date of Patent: May 18, 2004

(54) IMAGE FORMING APPARATUS AND COPY MANAGEMENT SYSTEM

(75) Inventors: Yoshikazu Ikenoue, Toyohashi (JP); Hideo Kumashiro, Toyokawa (JP); Munehiro Nakatani, Toyohashi (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 08/911,101

(22) Filed: Aug. 14, 1997

Related U.S. Application Data

(62) Division of application No. 08/327,223, filed on Oct. 21, 1994, now Pat. No. 5,671,277, which is a continuation of application No. 08/084,408, filed on Jun. 29, 1993, now abandoned.

(30) Foreign Application Priority Data

| Jun. 30, 1992 | (JP) | P4-172617 |
| Jun. 30, 1992 | (JP) | P4-172621 |
| Jun. 30, 1992 | (JP) | P4-172659 |
| Jun. 30, 1992 | (JP) | P4-172672 |
| Jun. 30, 1992 | (JP) | P4-172680 |

(51) Int. Cl.$^7$ ............................. G06K 9/00; G06K 9/46
(52) U.S. Cl. ................... 382/100; 382/195; 399/366; 283/93; 283/901; 283/902
(58) Field of Search ................... 382/100, 135, 382/195, 232, 317; 283/72, 93, 902, 901; 399/366; 380/51, 54, 3; 358/1.14

(56) References Cited

U.S. PATENT DOCUMENTS

| 1,002,600 A | * | 9/1911 | Morris et al. | 101/211 |
| 3,004,104 A | * | 10/1961 | Hembrooke | 341/182 |
| 3,784,289 A | | 1/1974 | Wicker | 350/321 |
| 4,668,597 A | * | 5/1987 | Merchant | 101/450.1 |
| 4,739,377 A | * | 4/1988 | Allen | 399/366 |
| 4,837,737 A | | 6/1989 | Watanabe | 364/900 |
| 4,847,641 A | | 7/1989 | Tung | 346/154 |
| 5,212,558 A | | 5/1993 | Obata et al. | 358/296 |

(List continued on next page.)

FOREIGN PATENT DOCUMENTS

| JP | 55-123270 A | 9/1980 |
| JP | 61-204766 U | 12/1986 |
| JP | 61-285578 A | 12/1986 |

(List continued on next page.)

OTHER PUBLICATIONS

"Unauthorized Copy Prevention." IBM Technical Disclosure Bulletin, pp. 59–60, Jun. 1975.*
"Document Security System for Copy Machines." IBM Technical Disclosure Bulletin, pp. 3550–3551, Jan. 1981.*
Hara et al. "An Improved Method of Embedding Data Into Pictures by Modulo Masking." IEEE Trans. on Communications, vol. 36, No. 3, pp. 315–331, Mar. 1988.*

(List continued on next page.)

*Primary Examiner*—Jon Chang
(74) *Attorney, Agent, or Firm*—Sidley Austin Brown & Wood LLP

(57) ABSTRACT

Additional data useful for the management of copies of a document for an image forming apparatus is embedded in a hard copy of the document. The additional data is embedded in an image of a document as discrete dots arranged in a prescribed format. Preferably, the size of each of said discrete dots is such as not to be recognized easily with the naked eye. The image data for embedding the additional data can be obtained by reading a document, or by receiving data sent from a computer. Additional data embedded in a hard copy can be extracted from the image data on the hard copy. Further, the production of a copy according to the image data, can be controlled according to the extracted additional data. Additional data is generated for each copy according to the extracted additional data for embedding it in a hard copy to identify each copy.

26 Claims, 23 Drawing Sheets

U.S. PATENT DOCUMENTS

| | | | |
|---|---|---|---|
| 5,216,724 A | 6/1993 | Suzuki et al. ................... | 382/7 |
| 5,231,663 A | 7/1993 | Earl et al. ...................... | 380/18 |
| 5,235,681 A | 8/1993 | Masuzaki et al. ............ | 395/164 |
| 5,243,655 A | 9/1993 | Wang ............................ | 380/51 |
| 5,245,655 A | 9/1993 | Buhn et al. .................... | 380/18 |
| 5,257,119 A | * 10/1993 | Funada et al. ............... | 283/901 |
| 5,299,026 A | * 3/1994 | Vincett et al. ............... | 358/401 |
| 5,315,098 A | * 5/1994 | Tow ............................. | 235/494 |
| 5,337,361 A | * 8/1994 | Wang et al. ................... | 380/51 |
| 5,374,976 A | * 12/1994 | Spannenburg ............... | 283/72 |
| 5,418,602 A | * 5/1995 | Nishikawa ................... | 283/901 |
| 5,424,807 A | * 6/1995 | Ohmura ....................... | 399/366 |
| 5,426,710 A | * 6/1995 | Suzuki et al. ............... | 382/135 |
| 5,481,377 A | * 1/1996 | Udagawa et al. ........... | 399/366 |
| 5,489,158 A | * 2/1996 | Wang et al. ................. | 235/379 |
| 5,583,614 A | * 12/1996 | Hasuo et al. ................ | 283/902 |
| 5,640,253 A | * 6/1997 | Uchida et al. ............... | 399/366 |
| 6,166,750 A | 12/2000 | Negishi ....................... | 347/131 |

FOREIGN PATENT DOCUMENTS

| | | |
|---|---|---|
| JP | 61-285578 A | 12/1986 |
| JP | 62-111800 A | 5/1987 |
| JP | 62-256046 A | 11/1987 |
| JP | 2-052384 | 2/1990 |
| JP | 02-096276 A | 4/1990 |
| JP | 2-111161 | 4/1990 |
| JP | 2-120753 | 5/1990 |
| JP | 2-161477 A | 6/1990 |
| JP | 2-266759 | 10/1990 |
| JP | 2-284189 A | 11/1990 |
| JP | 3-120561 | 5/1991 |
| JP | 3-256087 A | 11/1991 |
| JP | 04-009963 A | 1/1992 |
| JP | 04-343568 A | 11/1992 |
| JP | 5-219353 A | 8/1993 |

OTHER PUBLICATIONS

Tanaka et al. "Embedding Secret Information into a Dithered Multi–Level Image." Milcom '90, IEEE, vol. 1, pp. 216–220, Sep. 1990.*

Komatsu et al. "A Proposal on Digital Watermark in Document Image Communication and Its Application to Realizing a Signature." IEICE Transactions, vol. J2–B–I, No. 3, 1989, pp. 208–218.*

Komatsu et al. "Authentication System Using Concealed Image in Telematics." Memoirs of the Schoold of Science and Engineering, Waseda University, No. 52, pp. 45–60, 1988.*

Komatsu et al. "A Proposal on Digital Watermark in Document Image Communication and Its Application to Realizing a Signature." Electronics and Communications in Japan, Part 1, vol. 73, No. 5, 1990 (translation, pp. 22–33).*

Yasuhiro Nakamura & Kineo Matusi, "A Unified Coding Method of Image and Text Data Using Three–Level Micro–Patterns," Gazou Densi Gakkaishi vol. 17, No. 1 (1988) pp. 3–9.

Naohisa Komatsu, "Information Security For Facsimile Communication"; *Gazo Denshi Gakkkaishi (Journal of the Institute of Picture and Electronics Engineers)* vol. 19, No. 4, April 1990, pp. 229–235 and translation (pp. 1–12).

Costaa S. Xydes et al, "Embedding Data Into Pictures By Modulo Masking", *IEEE Transactions on Communications*, vol. COM–32, No. 1 January 1984, pp. 56–70.

Michio Yamada et al., "A Proposal on Secure Document Image Management Facilities Using Smart Card"," Proc. of 1989 Autumn Meeting of the Institute of Electronics, Information and Communication Engineers, SD–2–3, September 1989, pp. 223–224 and translation (3 pgs).

* cited by examiner

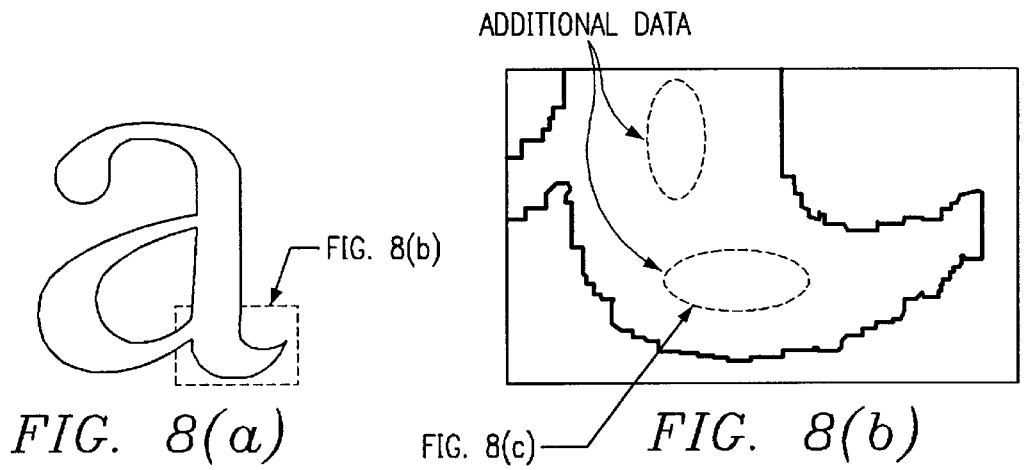
FIG. 8(a)  FIG. 8(b)
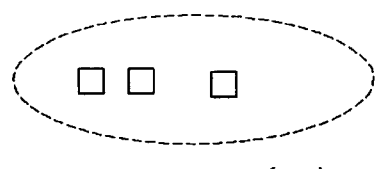 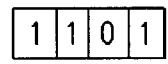
FIG. 8(c)  FIG. 8(d)
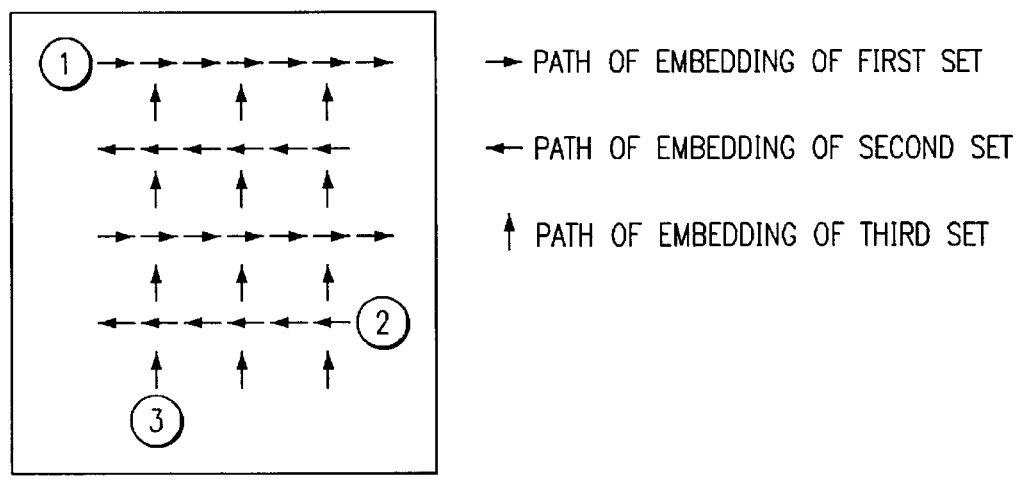
FIG. 9

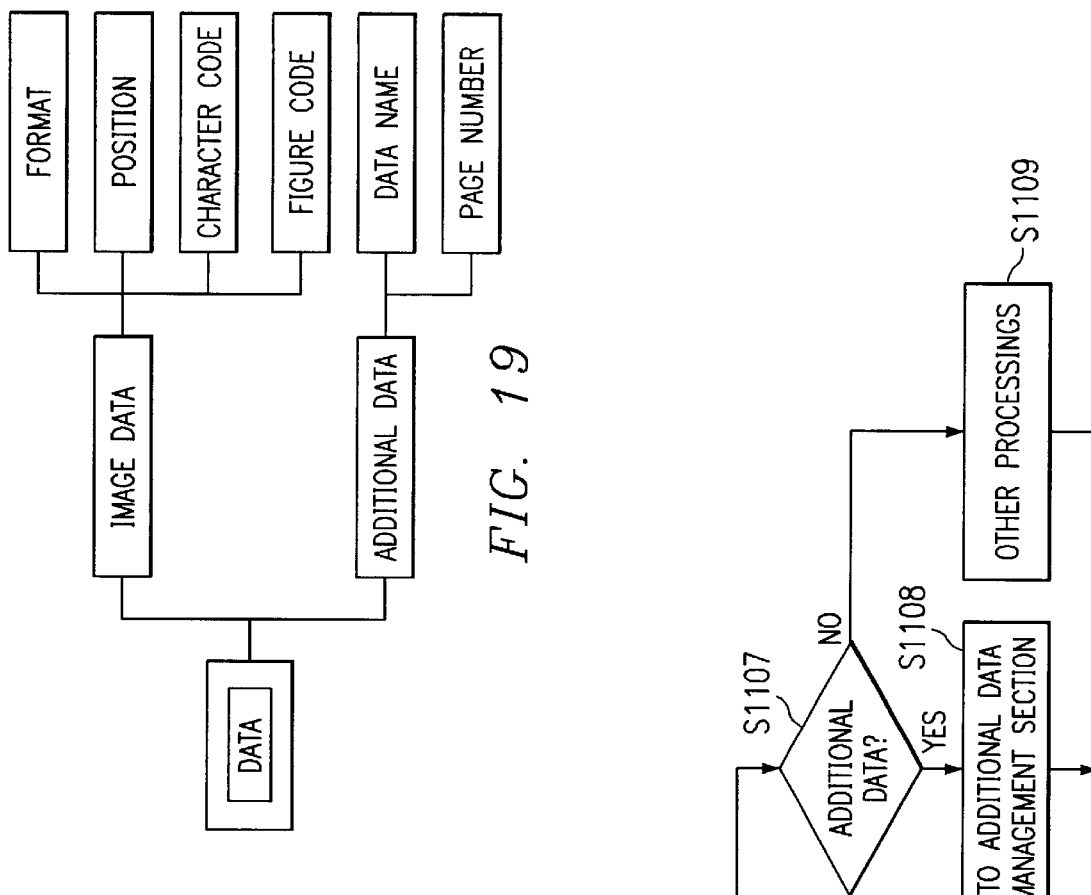
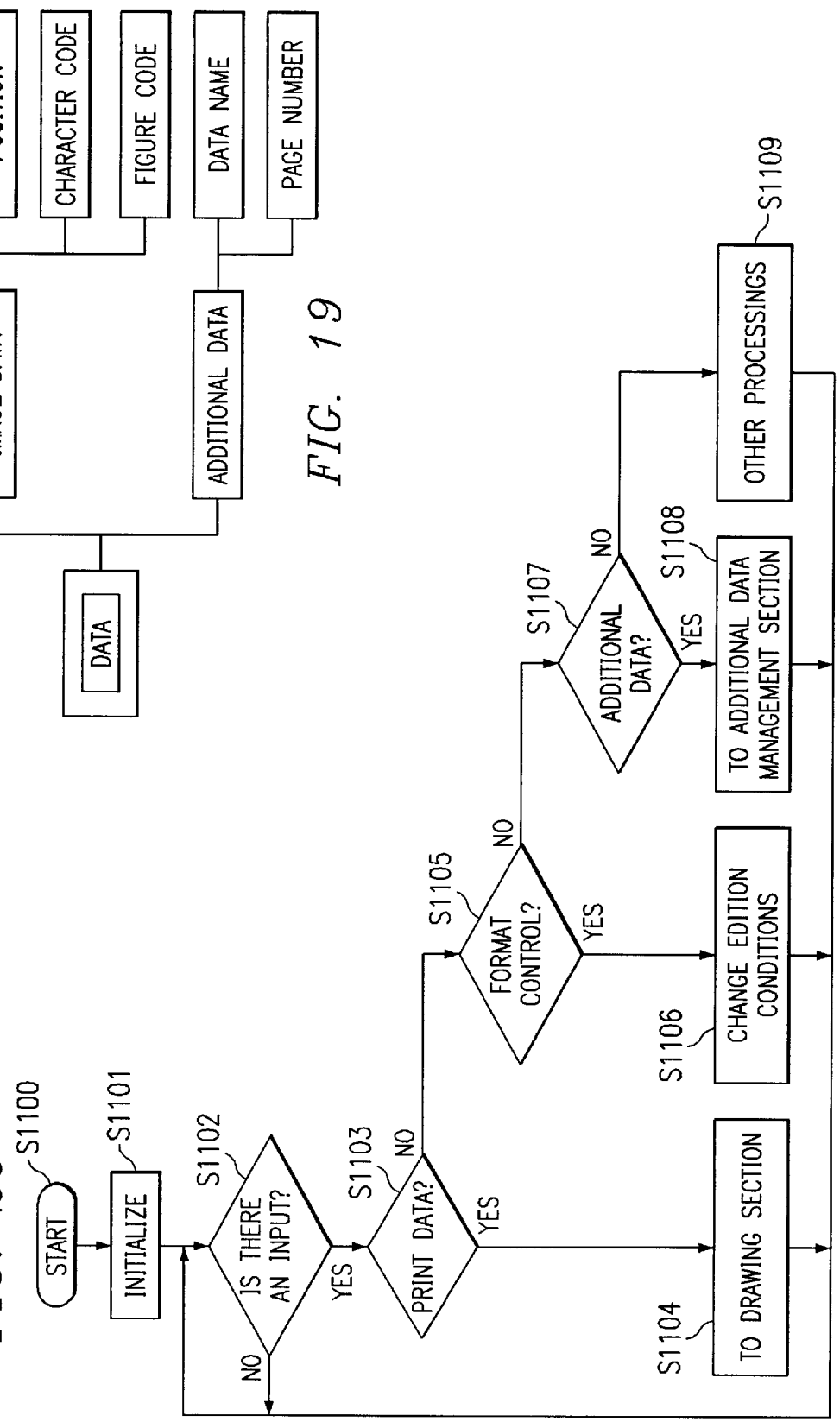

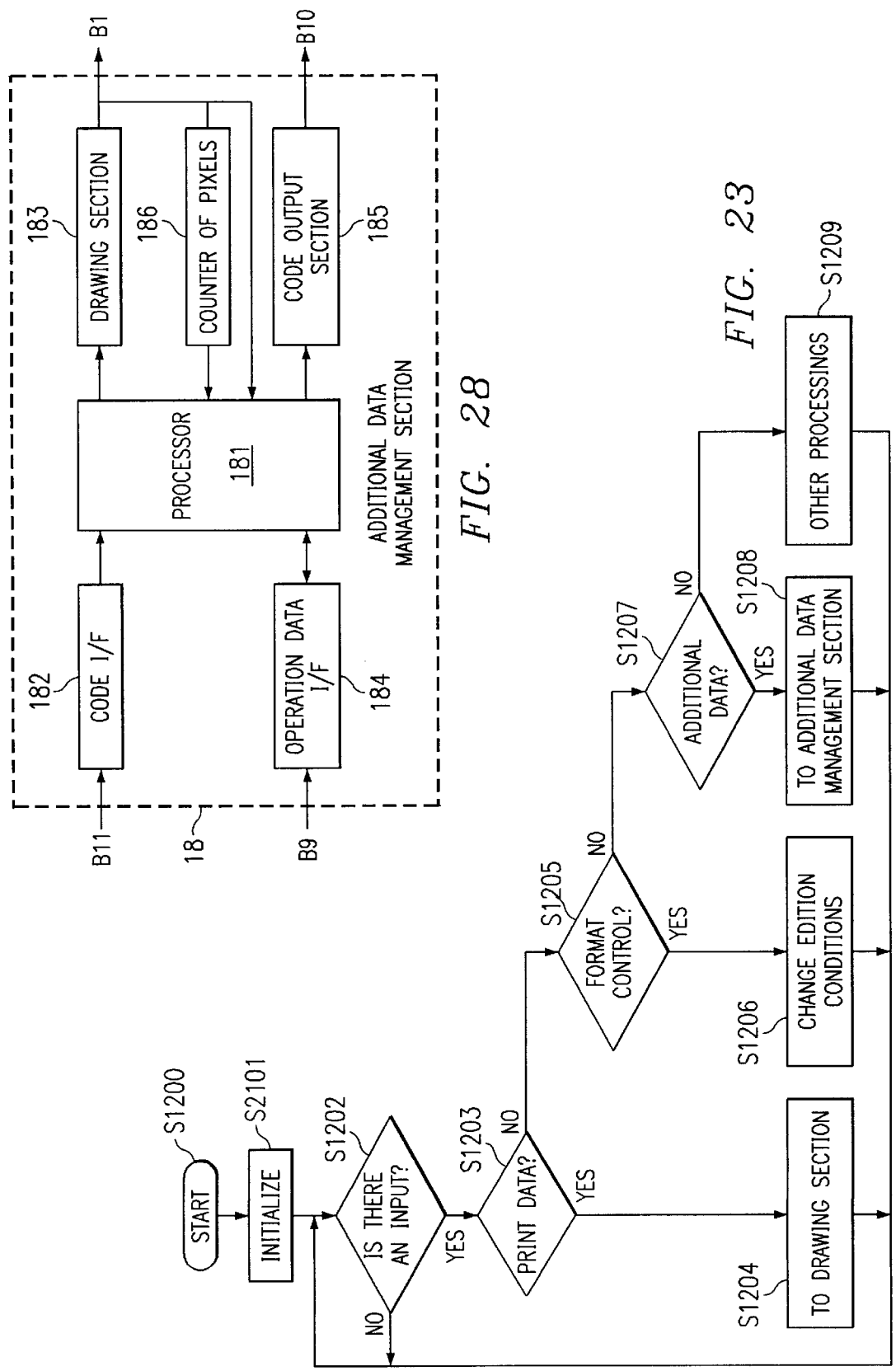

IMAGE FORMING APPARATUS AND COPY MANAGEMENT SYSTEM

CROSS REFERENCE TO RELATED APPLICATION

This is a division of U.S. patent application Ser. No.08/327,223, filed Oct. 21, 1994, now U.S. Pat. No. 5,671,277, which is a continuation of then application Ser. No. 08/084,408, filed on Jun. 29, 1993, now abandoned.

BACKGROUND OF THE INVENTION

1. Field of the Invention

The present invention relates to an image forming apparatus such as a printer or a copying machine for producing a copy and a management system therefor which can prevent illegal copy.

2. Description of the Prior Art

Recently, copying machines are developed and used widely. Then, infringement of copy right and illegal copies of secret documents become problems to be solved. However, it is impossible for analog copying machines to check an original document precisely. Further, for a document including a partial copy, it is quite impossible to manage hard copies after the second generation of copy of the original document.

There have been proposed many apparatuses and methods in order to prevent the leakage of secret documents by copying. For example, if a copying apparatus detects a phrase registered beforehand such as "DO NOT COPY" or "CONFIDENTIAL", the copy operation is stopped (Japanese Patent laid open Publication 266,759/1990). However, an illegal copy is easy by copying a document by shading the registered phrases. Therefore, if a copy is once obtained by shading the registered phrases, it cannot be prevented to be leaked. It is also disclosed that an illegal copy can be detected by using information on the characteristics of a document on the image of the whole document such as the position and the number of a specified character such as "u". However, this requires a memory of large capacity to store all characters.

In order to prevent illegal copies of paper moneys and valuable securities with a copying apparatus, it is proposed to store a pattern of characteristics of an image for prohibiting copying and to stop the copying operation for an image of a document including such a characteristic (Japanese Patent laid open Publication 52,384/1990). If a whole document image is stored as a characteristic pattern, this copying machine can deal with even a case where a part of the characteristic pattern is shaded. However, in order to store all characteristic information for a secret document, a memory of large capacity is needed also in this case. Further, it is difficult to detect all information in correspondence to copying operation.

It is also proposed that a password is needed for a copying apparatus (Japanese Patent laid open Publications 120,753/1990 and 120,561/1991). However, it is a problem that a password is needed even for a non-secret document.

On the other hand, in order to trace the origin of leakage of a secret document, it is proposed to add information to a part of a copy of a document (Japanese Patent laid open Publication 111,161/1990). That is, information such as recognition data of a copying apparatus, copy data and copy time are expressed as bar codes, and the bar codes are added in a part of a copy. However, this approach is ineffective if the bar codes to be added in a copy is shaded or if bar codes added for another non-secret document is stuck to a copy to re-generate the copy.

It is also proposed to change a font for a secret document from that of an ordinary document in order to recognize a copy of secret document from the others (U.S. Pat. No. 4,837,737). Then, even if the copies of secret documents are edited or changed, a copy of a secret document can be recognized. However, this approach is ineffective if a document includes only drawings, graphs or the like.

The synthesis of character data with an image data in the image processing with a computer is proposed (Yasuhiro Nakamura and Kineo Matsui, "A unified coding method of image and text data using three-level micro-patterns", Gazou Densi Gakkaishi Vol. 17, No.1 (1988) 3–9). In the image processing wherein the sum of the dots in a small area of n×n dots is used as a density of a dot to be displayed, a pattern corresponds with a density, and text data are synthesized with an image data by using the patterns. However, if this approach is applied to a copying machine, it is impossible to recognize the patterns in a hard copy. Therefore, this approach cannot be applied to trace the leakage of secret documents.

SUMMARY OF THE INVENTION

An object of the present invention is to provide an image forming apparatus which can prevent an illegal copy effectively.

Another object of the present invention is to provide an image forming apparatus which can detect an illegal copy effectively.

A further object of the present invention is to provide a copy management system which can manage copies to detect and to prevent an illegal copy.

In one aspect of the present invention, an additional data useful for the management of copies of a document produced by an image forming apparatus is embedded in a hard copy of the document. The additional data is embedded in an inherent image of a document as discrete dots arranged in a prescribed format. Preferably, the size of each of said discrete dots is not so large as to be recognized easily with naked eyes. The additional data can be embedded in unit of blocks. Further, the density of the discrete dots is selected to be different from the density adjacent to the discrete dots. The image data for embedding an additional data can be obtained by reading a document, or by receiving data sent from a computer or read from a floppy disk, In a second aspect of the present invention, an additional data embedded in a hard copy as mentioned above can be extracted from an image on the hard copy. That is, the image data includes an additional data embedded in the inherent image as discrete dots arranged in a prescribed format, and it can be recognized and extracted. Further, an image forming means for producing a copy according to the image data can be controlled according to the extracted additional data. For example, if the additional data means that the source of the hard copy is a secret document, the copying is allowed only for a legitimate user.

In a third aspect of the present invention, an additional data as mentioned above is generated for each copy according to the extracted additional data. Then, the generated additional data is embedded in a hard copy. Thus, each copy can be identified.

In a fourth aspect of the present invention, a management means stores the additional data generated for each copy produced in a plurality of printers and the like. Thus, copies of various sources can be managed systematically and illegal copies can be traced easily. If the additional data extracted from an image in a hard copy is not consistent with the additional data already stored, the printing of the hard copy may be prohibited.

In a fifth aspect of the present invention, a document such as a book includes a transmitter which transmits an additional data of the document wireless. The additional data received is used to control the image forming means.

An advantage of the present invention is that the situation of copying can be grasped according to the additional data. For example, the total copy number from the same original document can be counted easily.

Another advantage of the present invention is that an additional data for managing copies can be embedded in an image of a document without deteriorating the reproduced image substantially.

A still another advantage of the present invention is that an illegal copy such as a copy of a secret document by an non-legitimate user can be detected according to the additional data extracted from the copy.

A further advantage of the present invention is that the leakage of a secret document can be prevented.

A still further advantage of the present invention is that an illegal copy can be detected even if a document is edited.

BRIEF DESCRIPTION OF THE DRAWINGS

These and other objects and features of the present invention will become clear from the following description taken in conjunction with the preferred embodiments thereof with reference to the accompanying drawings, and in which:

FIG. 8(a) is a diagram of an image of a character "aa" embedding a block data;

FIG. 8(b) is an enlarged view of the lower right-hand section of FIG. 8(a);

FIG. 8(c) is an enlarged view of a portion of FIG. 8(b);

FIG. 8(d) is a numeric representation of the data bits showing 8(c);

FIG. 9 is a diagram illustrating a procedure for embedding blockdata of the additional data in a hard copy by using density blocks;

FIG. 19 is a diagram of a format of image data received from a computer;

FIG. 20 is a block diagram of packet analysis section;

FIG. 23 is a flowchart of the processing of the floppy disk analysis section;

FIG. 28 is a block diagram of an additional data management section;

DETAILED DESCRIPTION OF THE PREFERRED EMBODIMENTS

Figure 1:
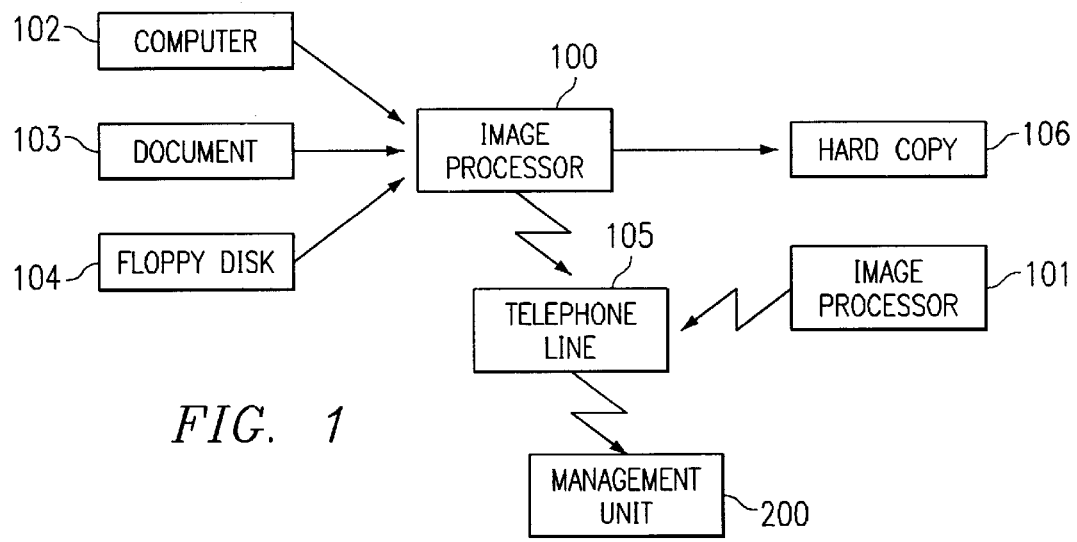
FIG. 1 is a block diagram of a hard copy management system.

Referring now to the drawings, wherein like reference characters designate like or corresponding parts throughout the views, embodiments of the present invention will be explained below in the following order:

(1) General outline of copy management system
(2) Binarization and embedding of additional data
(3) Detailed explanation of image processor
   3-1 Outline of the blocks in the image processor
   3-2 Image reader
   3-3 Operation unit
   3-4 Packet analysis section
   3-5 Floppy disk analysis section
   3-6 Image decision and recovery section
   3-7 Drawing section
   3-8 Additional data management section
   3-9 Secret management section
   3-10 Communication management section
   3-11 Main controller
(4) Management unit
   4-1 Structure of the management unit
   4-2 Format of memory
   4-3 Function of the management unit (1) General Outline of Copy Management System When a hard copy of an image read from a document is produced, a digital additional data used to manage copies is embedded in an image data and the synthesized image is printed. The digital additional data has a size so small that it cannot be recognized by an ordinary user with naked eyes.

Additional data to be embedded in a hard copy comprise for example following data: Is this a secret document? What generation is this copy from an original source such as an original document? When and by whom is this copy produced? That is, the additional data comprises data useful for copy management. Therefore, a new hard copy can be prevented to be produced from a hard copy with embedded additional data. Further, even if the secret document is leaked illegally, the leakage path can be confirmed and traced by reading the additional data embedded in the hard copy brought out illegally.

FIG. 1 shows a structure of a hard copy management system which comprises a plurality of image processors 100, 101 (and others not shown explicitly in FIG. 1 for simplicity) for producing copies and a management unit 200 for managing the copies. The image processors 100 and 101 produce copies of documents and send information including the number of the copies to the management unit 200, and the management unit 200 grasps the state of each image processor 100, 101. Sources for the image processors 100, 102 include a computer 102 and a floppy disk (FD) 104 as recording media besides a document 103.

When the image processor 100, 101 produces a hard copy according to image data read by or received from a source, it embeds an additional data on copy management in hard copies and sends the additional data via a telephone line 105 to the management unit 200 for managing the copy. If the document 103 is an original source, the image data includes only data on the document image. On the other hand, if the document 103 is a hard copy produced from an original source, the hard copy includes additional data added to images in the previous copying operation as well as the image data of the document. The management unit 200 analyzes the total number of illegal copies derived from original sources according to the additional data and the leakage path of the illegal copies on the basis of the additional data received from the image processor 100, 101.

Table 1 shows an example of additional data which consists of intrinsic data according to the image data received from each source and common data added irrespective of source. An additional data comprises information on generation, user, copying apparatus and the like. Therefore, by embedding an additional data in a hard copy, the leakage path of copies can be grasped.

TABLE 1

| | Additional data | |
|---|---|---|
| source | intrinsic data | common data |
| document | document name (e.g. book name) | user name |
| | book code | date |
| | page number | copy code |
| | generation code | generation code |
| | copy code | password number |
| | password number | apparatus recognition code |
| | rank of secret | forged document |
| | total pixel number | |
| | forged document | |
| computer | data name (file name and the like) | |
| | page number | |
| floppy disk | volume name | |
| | file name | |
| | page number | |

Figure 2:
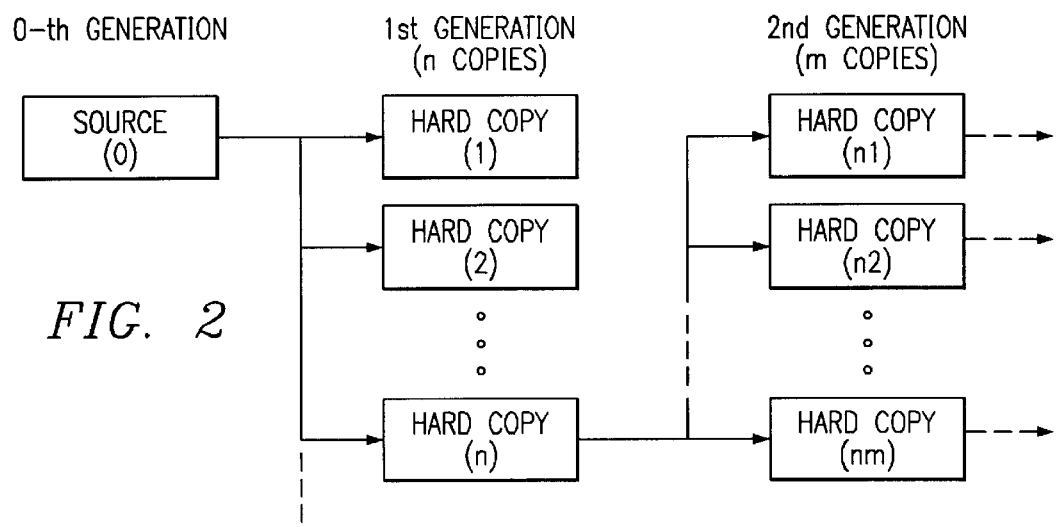
FIG. 2 is a diagram of an example of generation codes of hard copies embedded in hard copies.

In Table 1, the book code is an intrinsic code registered for each book in order to identify a book. The apparatus recognition code is a recognition number intrinsic for an image processor 100, 101 or the like which can add an additional data in order to identify which image processor 100, 101 processes and produces the hard copy. The volume name is a recognition code of a floppy disk 104 in order to identify which floppy disk is used to produce the hard copy. The generation code is a data used to represent the generation from the original source. FIG. 2 shows an example of generation codes. The generation codes of the hard copies in the first generation increases from "1" to "n" successively according to the sequential copy number up to "n". The generation codes of hard copies of second generation from the n-th hard copy in the first generation increases from "n1" to "nm" successively according to the sequential copy number up to "m". That is, the digits of the generation code increase with the generation. If a generation code is not included in the image data produced from a source, a data on the generation code is added always when a copy is produced, while if a source of the document 103 includes already a generation code, a new modified generation code is added in hard copies.

Figure 3:
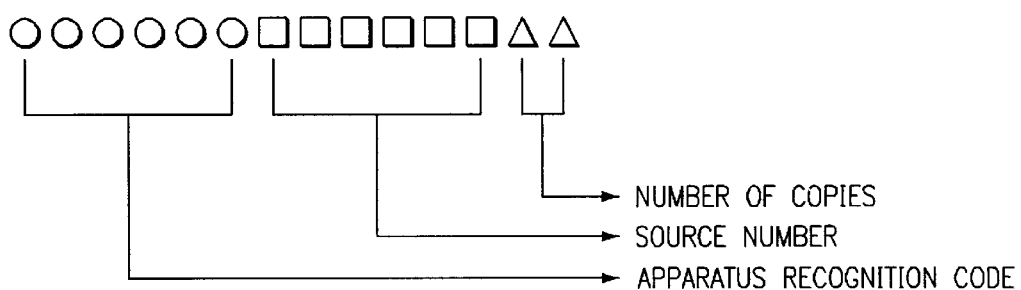
FIG. 3 is a diagram of an example of copy code.

The copy code denotes a sequential number of copies produced from a common original source, irrespective of generation code. As shown in FIG. 3, a copy code comprises an apparatus recognition code intrinsic for an image processor, a source number intrinsic for a source and the number of copies. The source number is assigned sequentially if only one image processor is used. If a plurality of image processors is used, the source number is assigned successively for copies for each image processor or it is determined by using both copy number and apparatus recognition code. Because the number of copies agrees with the lowest significant digits data in the generation code (refer FIG. 2), it can be omitted if a relation between the generation code and the number of copies is defined beforehand in the present system. If a copy code is included in an additional code as explained above, the number of the hard copies based on the same original can be obtained easily. If a legitimate user compares the copy number remembered by him or her with the result, it can be decided if illegal copying is performed or not.

If a password is not included in the image data from the source, a user can set a password by using an operation unit provided in the image processor 100, 101.

(2) Binarization and Embedding of Additional Data

An additional data is a digital data which can be embedded in an image as discrete points, and an example of the binary code of an additional data is explained below. Further, the embedding of the digital data in a plurality of areas in a hard copy will be explained next.

Figure 4:
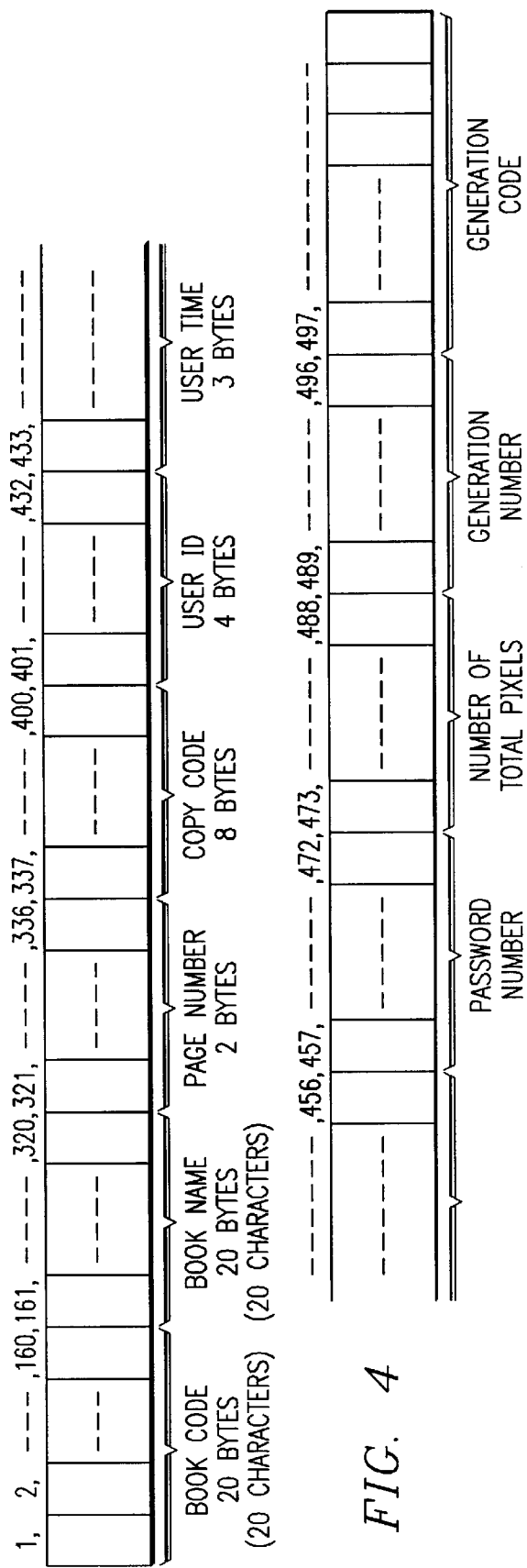
FIG. 4 is a diagram of an example of binarized data of additional data to be embedded in a hard copy.

An additional data is expressed as a continuous data with the above-mentioned data lengths as shown in FIG. 4. Most of the data in an additional data-can be defined with a specific length. For example, the book code and the book name can be expressed sufficiently with a data length of 20 digits (20 bytes), and 20 bytes are assigned to the book code and the book name. Similarly, 2 bytes, 8 bytes, 4 bytes, 3 bytes, 2 bytes and 1 byte are assigned to the page number, copy number, user identification number, use time data, password number, total number of pixels and the number of generations expressed in a generation code and generation code, respectively. Among the data shown in Table 1, only the generation code is a variable-length data and a data of 2 bytes times the number of generations. That is, the data length of the generation code is increased with the number of generations so as to avoid the assignment of unnecessary data length. Then, the total length of an additional data is 64 bytes (512 bits) or more.

Preferably, an additional data can be embedded in each hard copy in at least two positions. Further, the order of each data in the additional data is determined beforehand, and if a relevant data is not available, a temporary data of "0"'s or the like is substituted in an additional data.

The additional data has to be embedded by the image processor 100, 101 in a modest way so that an ordinary man cannot recognize it. However, there may be a case wherein it is hard to embed an additional data in a hard copy in a modest way because the data length of the additional data shown in FIG. 4 is long. In order to overcome this situation, an additional data can be divided into blocks of a predetermined data length for embedding it in the unit of block in a hard copy. A block number is added to each block in order to identify the position in the additional data. If it is difficult even to embed a block, the order of superiority in the blocks are determined beforehand, and blocks of inferior order are omitted to be embedded. In order to recover an additional data from a hard copy, data of each block with block number are read and the data are rearranged in the order of block number to restore the additional data. The data of blocks impossible to be read are deleted in the restored additional data.

Figure 5:
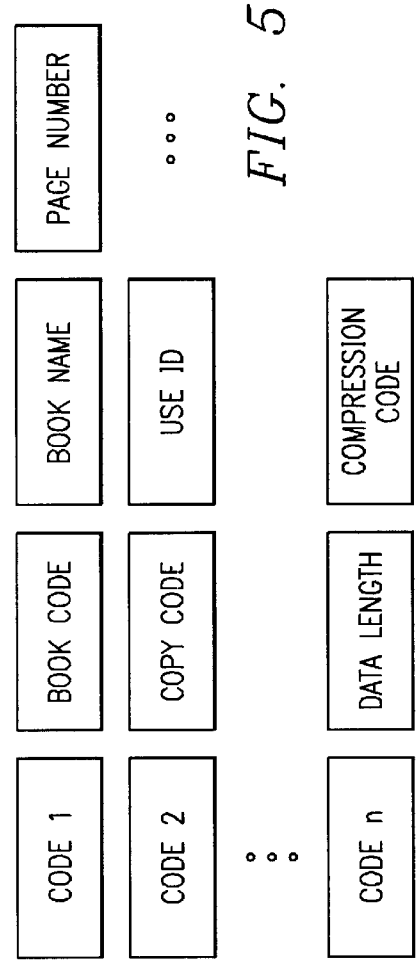
FIG. 5 is a diagram of an example of the binarized data divided into data of variable length.

Further, the block data may be generated in a different way. For example, as shown in FIG. 5, the data length of the blocks may be variable and a code may be added at the top of the blocks in order to recognize the format. In FIG. 5, the compression code means a code data compressed with a predetermined compression algorithm. In this method, it is needed to determine the compression algorithm of the compression code and the like beforehand.

Figure 6:
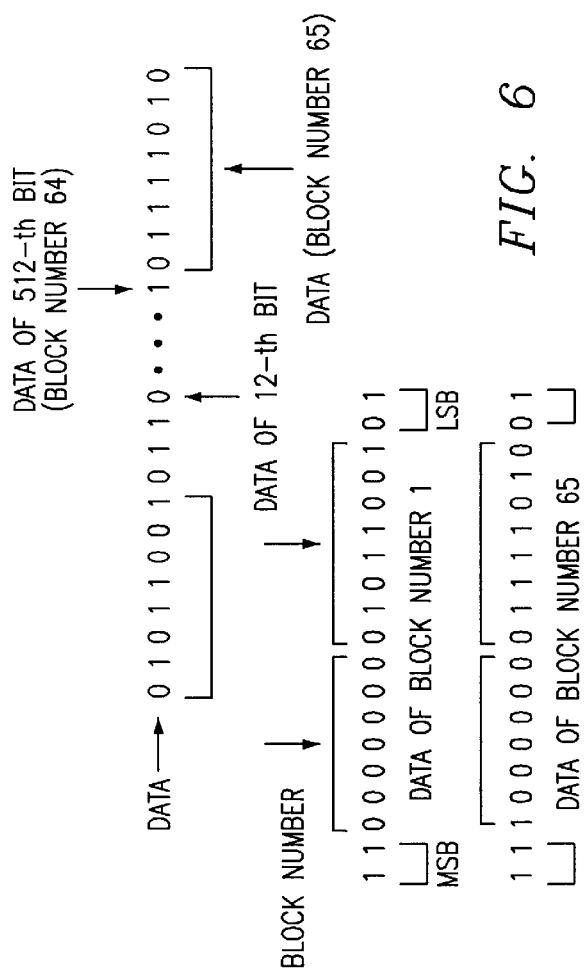
FIG. 6 is a diagram of an example of block data of block number "1" and "65" when binarized data of an additional data is divided into 8-bit data.

In this embodiment, an additional data shown in FIG. 4 is divided in the unit of 8 bytes. FIG. 6 shows examples of block data of the first and 64-th blocks in this case. A block number is expressed as a 7-bit data, and a block data of total 15 bits is defined with MSB of "11" and LSB of "01". In order to read each block data embedded in a hard copy, a data is decided as an embedded block data if there are pixels of a predetermined number between MSB of "11" and LSB of "01".

Figure 7:
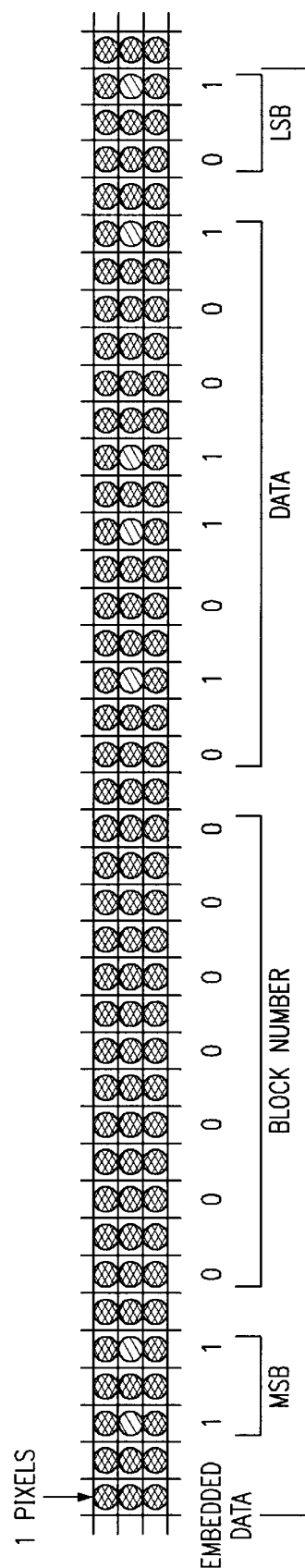
FIG. 7 is a diagram of an example of density data of block data of block number "1" embedded in an image.

FIG. 7 shows a situation of embedding the block data of the first block shown in FIG. 6 in an image. When a block data is embedded in an image, one level (say "0") of a binarized data is expressed at a density which is the same as those of adjacent pixels, while the other level ("1") is expressed at a density which is different a little from those of adjacent pixels. This data is hereinafter referred to as "density data". Further, in the example shown in FIG. 7, each density data in a block is arranged with a distance of one pixel. A block data consists of total 19 bits (=2+7+8 +2), and it can be embedded if there is a line of a length more than 40 dots, as shown as a central horizontal dot line in FIG. 7. The 40 dots has a length of ⅒ inch (about 2.5 mm) for a printer or an image reader of a resolution of 400 dots per inch, and black lines of such a length may exist in most documents including characters. That is, an additional data of 40 dots can be embedded sufficiently in such a document.

Next, the data conversion into density data and the embedding of additional data of blocks in an image in a hard copy is explained. FIGS. 8(*a*)–(*d*) illustrate an example of the data conversion and the embedding. FIG. 8(*a*) denotes an enlarged view of a character "aa" of a font of 12 point, while FIG. 8(*b*) denotes an enlarged view of a part of the character "a" of FIG. 8(*a*). In this example, an additional data ("1101") is embedded at positions as shown in FIG. 8(*c*) encircled by an oval. a The density data shown in FIG. 8(*c*) is obtained by converting the data ("1101") shown in FIG. 8(*d*), and they are embedded at a constant pitch (pixel distance).

Block data of additional data can be embedded in an image at an arbitrary position irrespective of position and direction of density data, and each dot of an additional data is so small not to be recognized with naked eyes. Because the embedding position of an additional data is not definite, it becomes impossible for a user who wants to leak secret documents to copy them by shading the additional data embedded in a hard copy.

However, if block data are embedded in a certain area, they become prominent as noises. Because an additional data is desirable not to be recognized by an ordinary user, it is embedded dispersed in a hard copy. As an example shown in FIG. 9, additional data are embedded along three directions, successively from a corner. Further, in order to minimize the possibility of the absence of density data for a dirty document or for a. document prepared as a patchwork, it is desirable to embed a plurality of sets of the same additional data repeatedly in a hard copy as shown in FIG. 9. There may be a case wherein a part of an additional data is recovered erroneously due to dirtiness or the like. In this case, an odd number of sets of additional data is embedded in a hard copy, and an effective data is determined from a decision by majority.

Figure 10A:
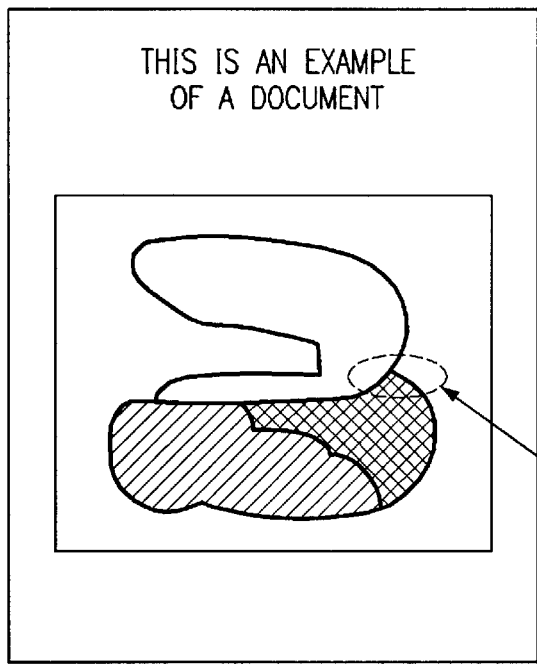
FIG. 10(a) is a diagram of an example of an image of a document consisting of various densities wherein additional data is embedded.
Figure 10B:
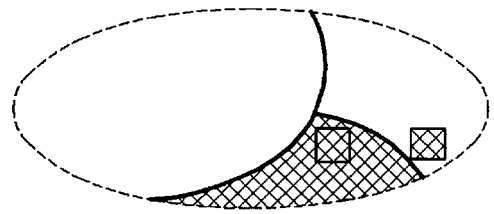
FIG. 10(b) is an enlarged view of the right-hand section the image shown in FIG. 10(a)

For a document wherein the density of an image changed complicatedly, it becomes hard for an additional data to be recognized from an image. Therefore, an additional data is embedded at an area wherein the density changes little. However, an additional data can also be embedded over a plurality of areas if there is no density change in each of the areas for example in two areas as shown in FIG. 10(*b*), or if there are areas not having a density assigned for the additional data.

Figure 11A:
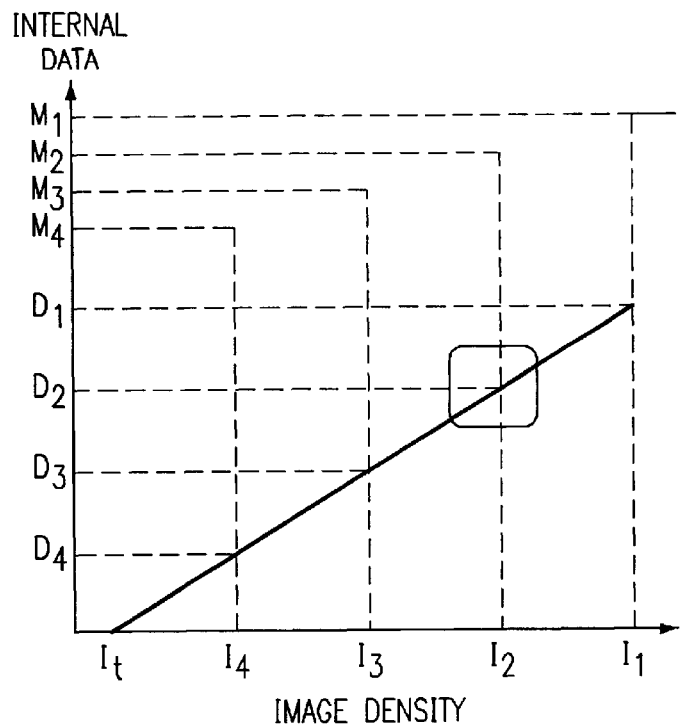
FIG. 11(a) is a diagram for changing the density of a document image when the density of the document image changes continuously.
Figure 11B:
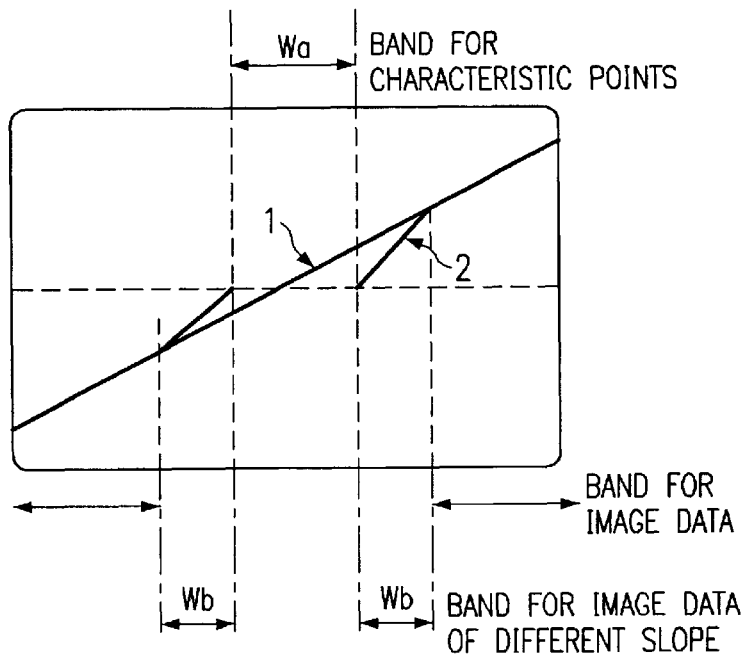
FIG. 11(b) is an enlarged view of the area designated by the box in FIG. 11(a)

In principle, a predetermined density band is assigned for density data generated from block data in order to embed an additional data. However, as shown in FIG. 11(*a*), for a half-tone image wherein the density changes continuously, the density values are changed for a density band "Wa" assigned to density data of block data, as shown enlarged in FIG. 11(b). That is, in FIG. 11(b) density bands "Wb" at both sides of the density band "Wa", the slope "1" of reproduced density with the image density is changed as slopes "2", or the image density of document in the density band "Wa" is driven out from the band "Wa".

Figure 12A:
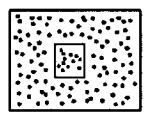
FIG. 12(a) is a diagram of an example of a process of embedding additional data for a document image wherein a long data cannot be embedded continuously.
Figure 12B:
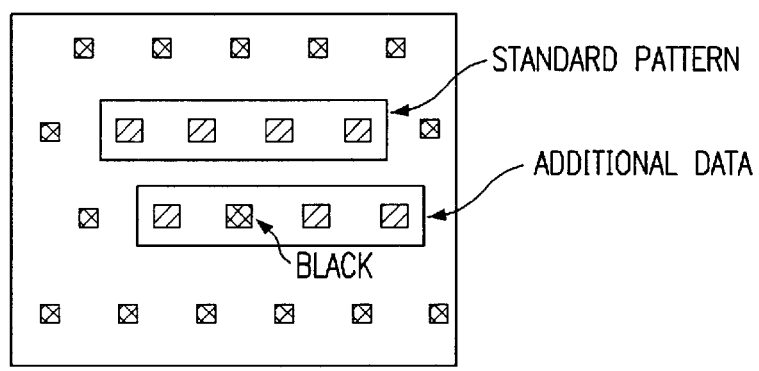
FIG. 12(b) is an enlarged view of the middle section in FIG. 12(a)

A long continuous density data cannot be embedded in some figures such as a pattern of parallel narrow lines or the like. In FIG. 12(a), density data can be embedded even in such a case by using each pattern itself as a density data to express an additional data. Further, as shown in FIG. 12(b), a standard pattern may be embedded in parallel to the additional data (four dots in this example) without using density data for MSB and LSB, and an additional data as long as the standard pattern can be embedded. In this method, though the width is enlarged, the length can be shortened.

By performing the above-mentioned procedure, an additional data is embedded in a document image (refer to step S742 in FIG. 33), and a hard copy embedded with the additional data can be printed. Then, by reading the additional data embedded in a hard copy, it can be decided if the hard copy is related to a secret document or when was the document copied, which apparatus was used to copy the document, how much was the number of copies of the document and so on. Then, the leakage of a secret document can be traced up to the leakage source.

(3) Detailed Explanation of Image Processor

Figure 13:
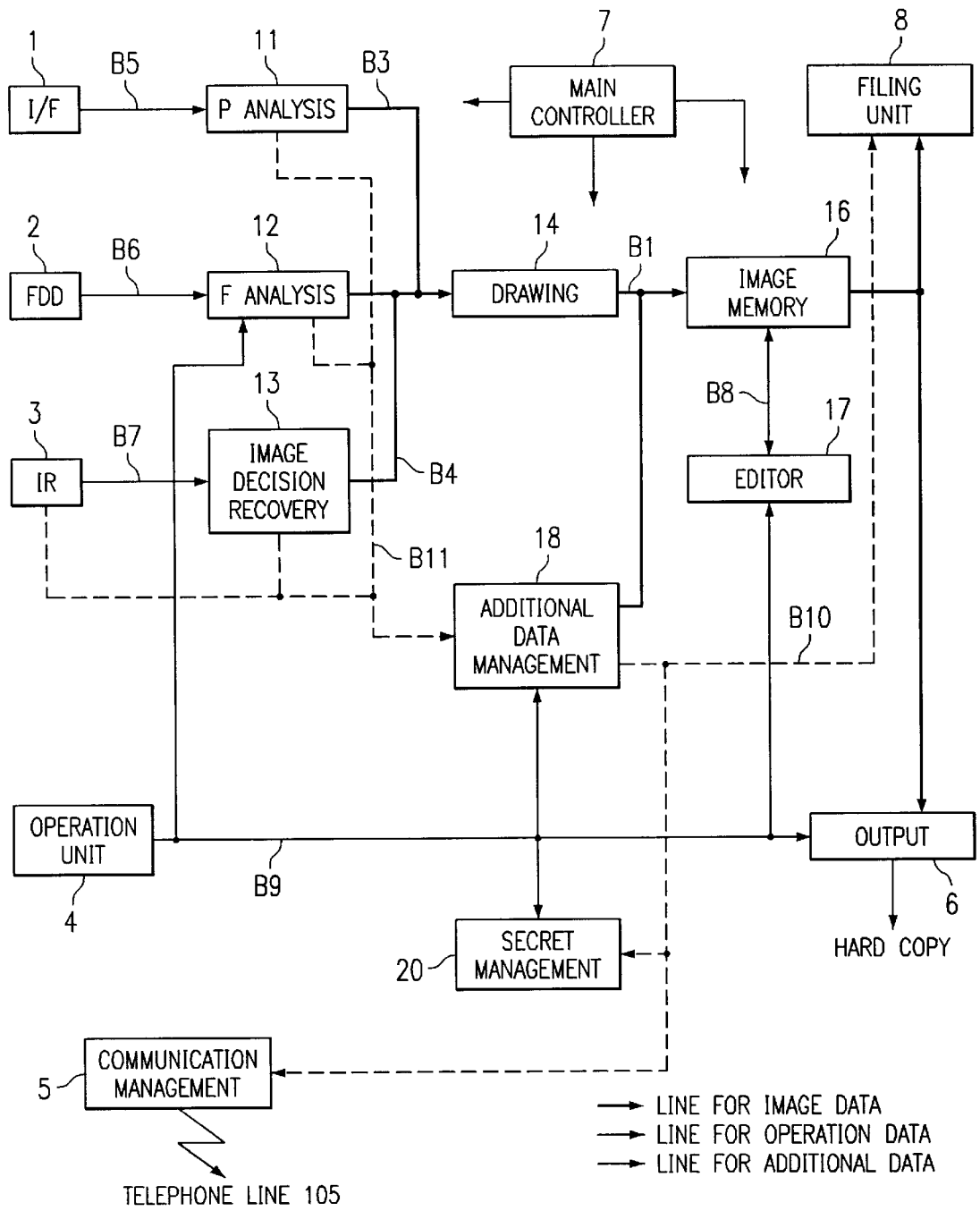
FIG. 13 is a block diagram of a processor which also illustrates a main flow of data.

The structure and the function of the image processor 100 for reproducing a copy is explained below in detail. FIG. 13 shows a block diagram of the image processor 100 and the flow of main data. The flow of the control data for controlling the timing of the entire image processor 100 and the like is omitted to be displayed. The thick solid line shows a flow for image data, the thin solid line shows a flow for the data on operation, and the dashed line shows a flow for additional data.

3-1 Outline of the Blocks in the Image Processor

An outline of the blocks shown in FIG. 13 will be explained below. Details of each block are explained later. An external interface 1 receives image data from a computer and sends it to a packet (P) analysis section 11. The packet analysis section 11 analyzes image data received by the external interface 1 and extracts image data and additional data. A floppy disk drive (FDD) 2 sends image data of a floppy disk to a floppy disk (F) analysis section 12, and the 2 floppy disk analysis section 12 analyzes the received data to extract image data and additional data. A drawing section 14 generates image data in correspondence to the image data extracted by the packet analysis section 11 or by the floppy disk analysis section 12. An image reader 3 reads a document placed on a platen and sends the read data to an image decision recovery section 13 if the document is an original one awhile to an additional data management section 18 for a document including an additional data. The image decision recovery section 13 analyzes the data read by the image reader 3, extracts an additional data from the image data, recovers the additional data and image data including only image information. The additional data management section 18 compiles various additional data added to the data obtained from various sources, generates and embeds a new additional data to the image data stored in an image memory 16, and sends the additional data via a communication management section 4 to the management unit 200. The image memory 16 is used to edit image data to be printed by an output unit 6. A filing unit 8 stores image information received from the image memory 16 and the additional data from an additional data management unit 18 separately by relating the two kinds of data. An operation unit 4 is used to set copying conditions, to display additional data from each source, to display an alarm message for a copying of a secret document according to a secret management section 20 and to input a user ID number, a type of source and the like. The output unit 6 is an electrophotographic printer which produces a hard copy on the basis of image data with an additional data from the image memory 16 according to the instructions from the operation unit 4. This is, a laser beam exposes a charged photoconductor according to the image data, and the resultant latent image is developed to be transferred on a paper with a known electrophotographic process. An editor 17 processes forging of an image in the image memory 16 according to the instructions from the operation unit 4. The secret management section 20 decides the inhibition of copying and the like according to the additional data compiled in the additional data management section 18 and to the data set by the operation unit 4. The communication management section 5 sends data on the production of a hard copy via a telephone line 105 to the management unit 200 when image data is read from a source or when a hard copy is produced. A main controller 7 controls the whole sequence of the image processor 100 such as the read of image data from a source, the start of the packet analysis section 11 and the like, the hard copy processing, the secret management and the like.

3-2 Image Reader

The image reader 3 reads a document 103 placed on a platen and it sends the read data to the image decision recovery section 103 if the document is an original document while it sends an additional data as well as image data to the image decision recovery section 103 if the document includes an additional data. Further, if a document is installed with a code transmitter, the image reader 3 receives the code information and sends it to the additional data management section 18 as will be explained later. Such a document may be a book which is installed with a code transmitter in order to prevent copying against a copy right.

Figure 14:
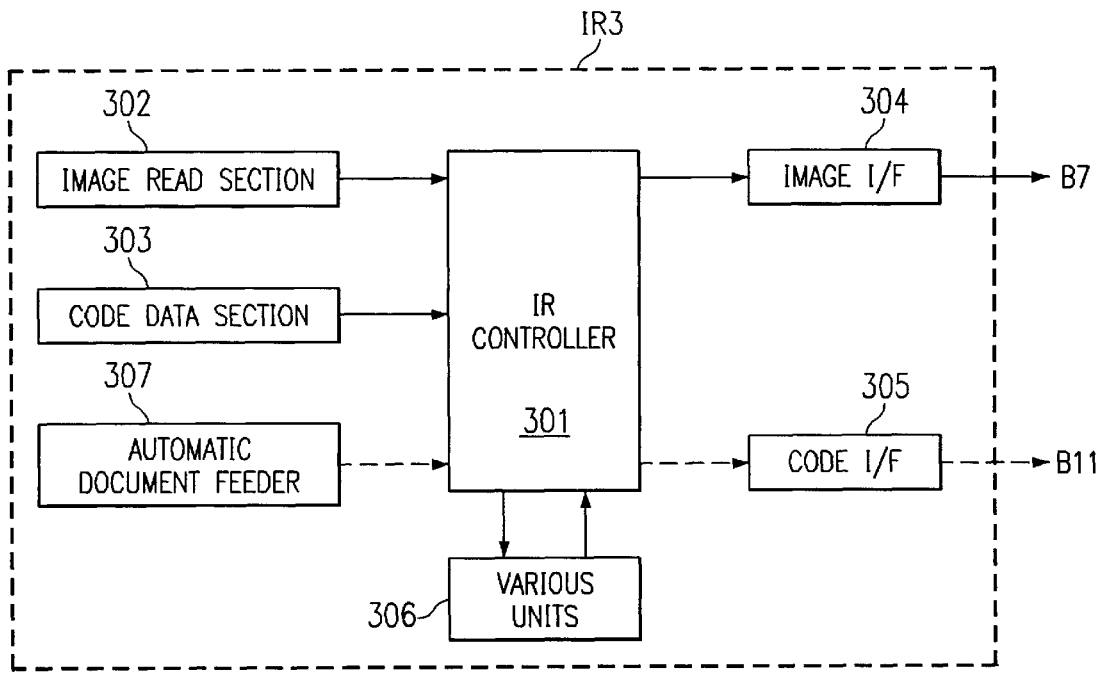
FIG. 14 is a block diagram of an image read section.

FIG. 14 shows a block diagram of the image reader 3. In the image reader 3, an image read section 302 reads a document set on a platen to send the image data to an image reader controller 301, which sends the image data via an image interface 304 to a bus B7. A code data read section 303 reads code data other than the image data to send it to the image reader controller 301, which sends the code data via a code interface 305 to a bus B11. An automatic document feeder 307 discharges a document on the platen and feeds a new document on the platen automatically. The image reader controller 301 controls various components such as a motor to drive the image reader 3.

Figure 15:
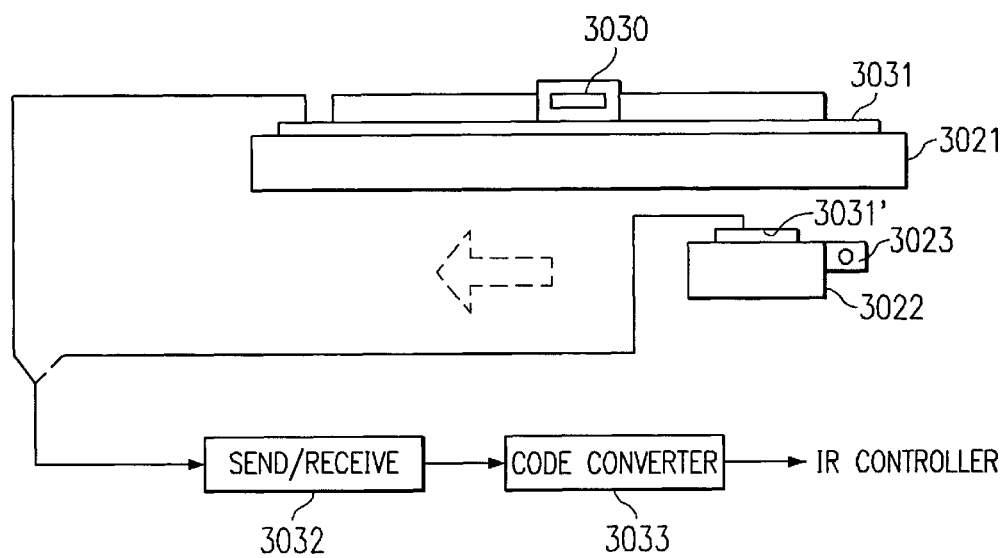
FIG. 15 is a block diagram of an image read section and a code data read section in the image read section.

FIG. 15 shows an apparatus which plays roles as the image read section 302 and the code read section 303. A document is placed on a platen glass 3021. A code data is read wireless with use of electromagnetic waves. That is, a code transmitter 3030 installed in a document such as a book transmits code data such as a book name, book code and the like, and the code data is detected with an antenna coil 3031. Because wireless data is received, a read error due to dirtiness of the platen glass 3021 can be prevented. A sender/transmitter 3032 receives the code data and sends it via a code converter 3033 to the image reader controller 301 (FIG. 14).

This type of code reader 303 cannot be used for documents such as a sheet of paper which cannot contain a code transmitter 3030. The antenna coil 3031 is made of a transparent material on the platen glass 3020. However, a coil 3031' may be provided on a scanner 3022 which moves below the platen 3021 to scan a document on the platen glass 3021. The document is exposed by a lamp 3023.

When the antenna 3031 is used, the code data is read before the scan of the scanner 3022 for image read and before the turning on of the exposure lamp 3023 in order to avoid read errors due to noises generated by the image reader 3 itself. When the coil 3031' is used, the code data is read in a prescan before turning on the exposure lamp 3023 in order to reduce noises as much as possible.

Figure 16:
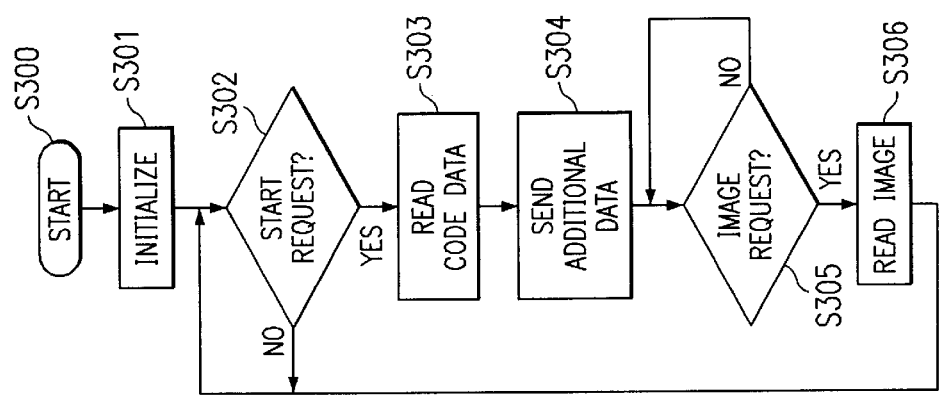
FIG. 16 is a flowchart of the processing of the image read section.

FIG. 16 shows a flow of the image reader controller 301. When an electric power source of the image reader 3 is turned on, the initialization is performed first (step S301). For example, the scanner 3022 is positioned at the start position and the output of the exposure lamp 3023 has kept constant. Next, if a user is decided to press a code data read key (not shown) provided in the operation unit 4 (YES at step S302), code data (additional data) of a document on the platen glass 3021 is read (step S303). When a code transmitter 3030 is installed in a document, the code data is received by the antenna 3031 or by the coil 3031'. Then, the code data is sent to the image reader controller 301 via the sender/transmitter 3032 and the code converter 3033 (step S304). Next, if an image read key (not shown) provided in the operation unit 4 is decided to be pressed (YES at step S305), the image read section 302 reads a document on the platen 3021 (step S306). That is, in the image read section 302, a document is exposed by the lamp 3023, the scanner 3022 is moved to read image data, and the obtained image data are sent to the image reader controller 301.

3-3 Operation Unit

Figure 17:
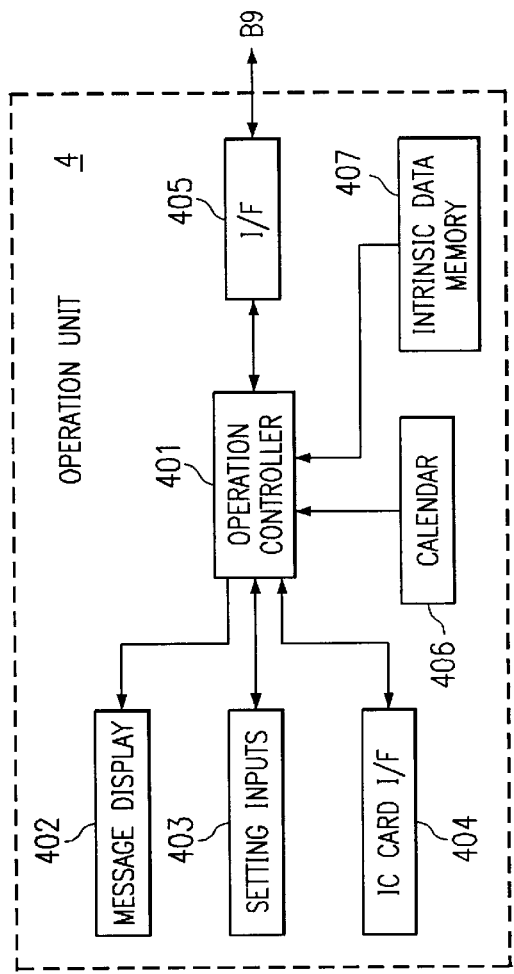
FIG. 17 is a block diagram of an operational section.

FIG. 17 shows a block diagram of the operation unit 4 shown in FIG. 13. In the operation unit 4, copying conditions are set, additional data read from each source are displayed, a password, a user ID, the source type or the like can be inputted, and an alarm is displayed when the secret management unit 20 decides to prohibit the copying.

An operation controller 401 controls the operation unit 4. A message display 402 displays an additional data read from a source, and displays an alarm message when the secret management section 20 decides to prohibit the copying. A setting input section 403 is used to designate the type of source, to set the copying conditions of the output unit 6 for producing a hard copy, to indicate the forging processing for the editor 17 and to input a user ID number and the like. An IC card interface 404 is used to input a user ID number with use of an IC card owned by each user. The input data is sent via an interface 405 to a bus B3 to the external. A calendar 406 manages the year, month, day and time. An intrinsic data memory 407 stores intrinsic recognition code which has been determined beforehand for each image processor.

3-4 Packet Analysis Section

Figure 18:
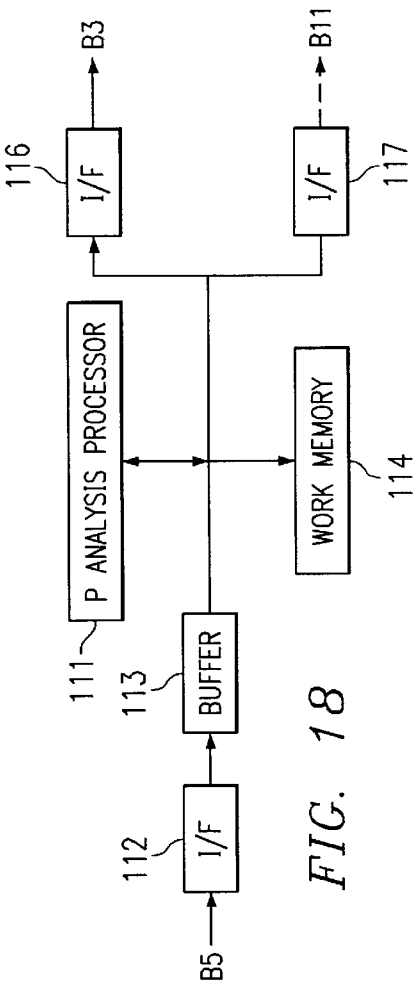
FIG. 18 is a block diagram of a packet analysis section.

The packet analysis section 11 shown in FIG. 13 analyzes the image data received from the computer 102 via the external interface 1. FIG. 18 shows a block diagram of the packet analysis section 11. Image data is received via an interface 112 and stored in a buffer 113. The image data received by the interface 112 has a predetermined format and as shown in FIG. 19, it consists of an image data and an additional data. The additional data includes a data name such as a file name and a page number, while the image data includes a format designation data, a position designation data, character codes and figure codes. The packet analyses processor 111 analyzes the image data stored in the buffer 113 by using a work memory 114 and sends image data on print output via an interface 116 to the drawing section 14 and an additional data via an interface 117 to the additional data management section 18. The drawing section 14 generates image data in an image memory 18 according to the receive image data.

FIG. 20 shows a flow of the analysis of the packet analysis unit 11. This processing may be performed by the packet analysis controller 111. After the initialization (step S1101), an image data is waited to be received from the external interface 1 connected to the computer 102 (step S1102). When an image data is received, the data is analyzed. That is, print data (character codes and figure codes) (YES at step S1103) are sent to the drawing section 14 (step S1104). If a format control data such as a format data or a print position data is received (YES at step S1105), internal edition conditions are changed according the data (step S1106). If an additional data is received (YES at step S1107), it is sent to the additional data management section 18 (step S1108). Otherwise a different processing is performed (step S1109). This processing may also be performed by a processor 701 in the main controller 7 with time sharing.

3-5 Floppy Disk Analysis Section

Figure 21:
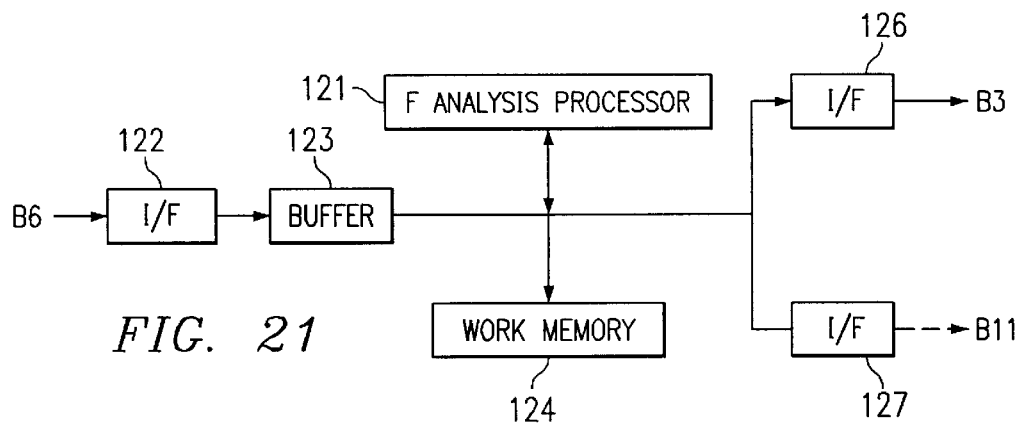
FIG. 21 is a block diagram of floppy disk analysis section.
Figure 22:
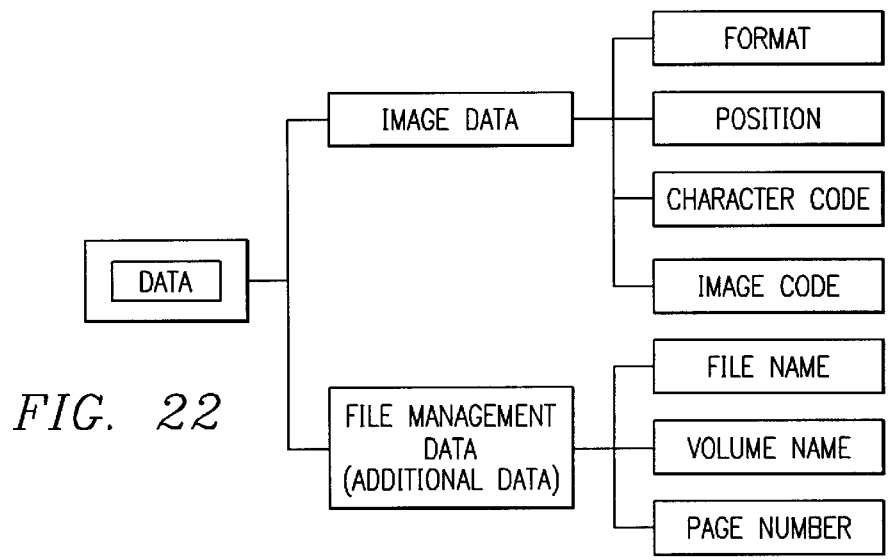
FIG. 22 is a diagram of a format of image data received from a floppy disk.

FIG. 21 shows a block diagram of the floppy disk analysis section 12 which analyzes the image data stored in a floppy disk. A floppy disk stores a plurality of files, and a file is designated via a bus B9 from the operation unit 4. Image data in a floppy disk is received via an interface 122 and stored in a buffer 123. The image data received by the interface 122 has a predetermined format and as shown in FIG. 22, it consists of an image data and an additional data. The additional data includes a volume name of the floppy disk, a data name such as a file name and a page number, while the image data includes a format designation data, a position designation data, character codes and figure codes. The floppy disk analysis processor 121 analyzes the image data stored in the buffer 123 by using a work memory 124 and it sends image data on print output via an interface 126 to the drawing section 14 and an additional data via an interface 127 to the additional data management unit 18. The drawing section 14 generates image data in an image memory 18 according to the receive image data.

FIG. 23 shows a flow of the analysis of the floppy disk analysis unit 21. This processing may be performed by the floppy disk analysis controller 121. After the initialization (step S1201), an image data is waited to be received via a bus B6 connected to the floppy disk drive 2 (step S1202). When an image data is received, the data is analyzed. That is, print data (character codes and figure codes) (YES at step S1203) are sent to the drawing section 14 (step S1204). If a format control data such as a format data or a print position data is received (YES at step S1205), internal edition conditions are changed according to the data (step S1206). If an additional data is received (YES at step S1207), it is sent to the additional data management section 18 (step S1208). Otherwise a different processing is performed (step S1209). This processing may also be performed by a processor 701 in the main controller 7 with time sharing.

3-6 Image Decision and Recovery Section

The image decision and recovery section 13 analyzes image data to separate image data on printing from block data embedded as an additional data. Further, it recovers a continuous additional data from the block data, and it also recovers the image data of a document before adding the additional data.

Figure 24:
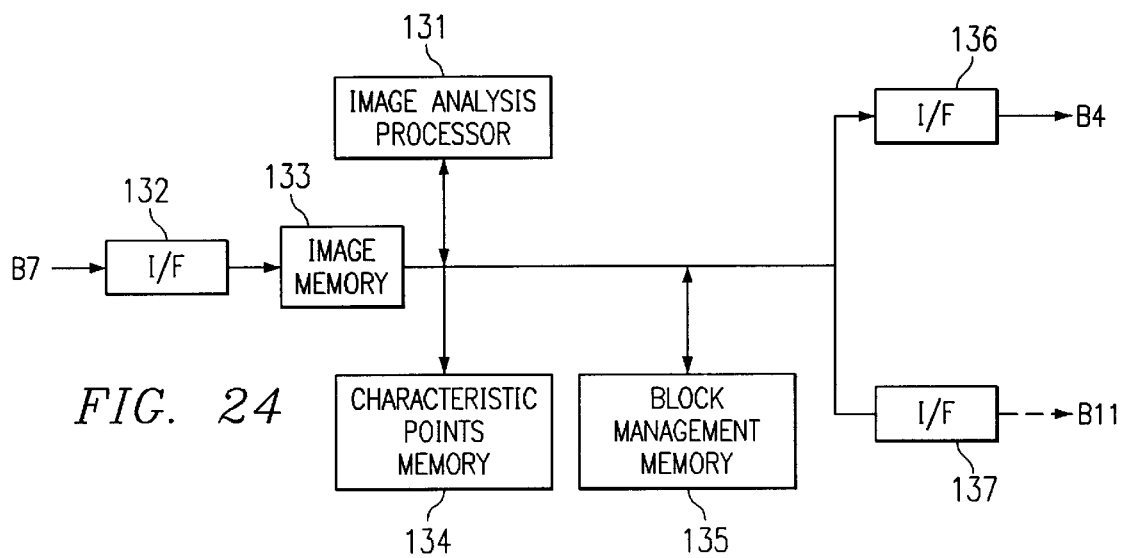
FIG. 24 is a block diagram of image decision and recover section.

FIG. 24 shows a block diagram of the image decision recovery section 13. Image data is received via an interface 132 and stored in an image memory 133. The image analyses processor 131 analyzes the image data stored in the image memory 133 by using a characteristic point memory 134 and a block management memory 135 and sends recovered image data via an interface 136 to the drawing section 14 and an additional data via an interface 137 to the additional data management unit 18.

Figure 25:
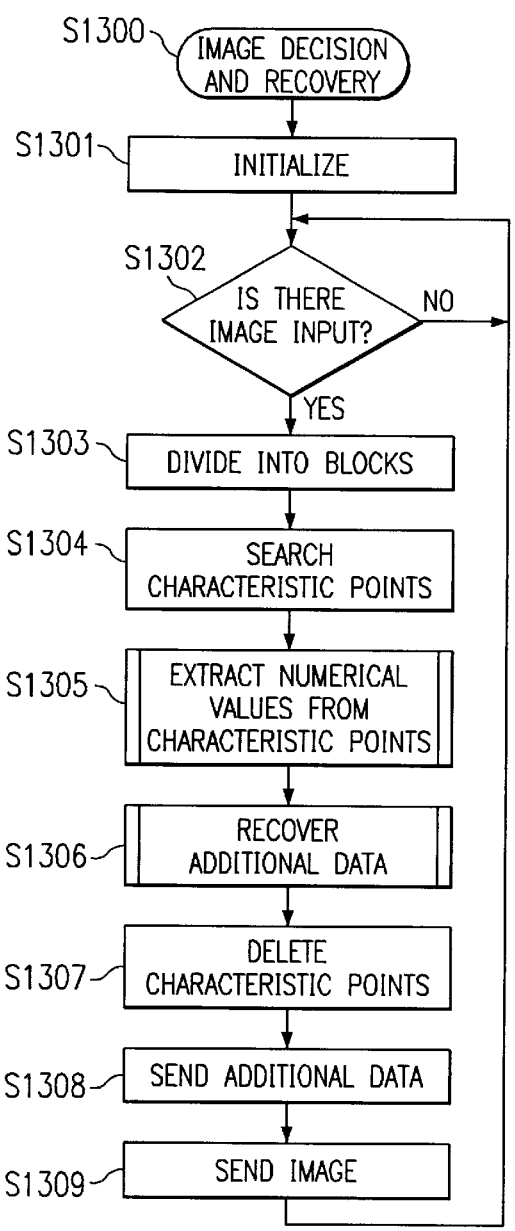
FIG. 25 is a flowchart of the processing or the image decision and recover section.

FIG. 25 shows a flow performed by an image analysis processor 131. After the initialization (step S1301), an image data is received (YES at step S1302). Then, the image data are divided into areas each for different density distribution in an image (step S1303), and coordinates for characteristic points are searched (step S1304). A characteristic point denotes a pixel having a predetermined density (refer FIG. 7). Further, binary numbers are extracted from the characteristic points according to the predetermined position relation (step S1305, refer to FIG. 26). The binary numbers extracted in the unit of blocks are rearranged in the order of block number according to a predetermined procedure to recover an additional data (step S1306, refer to FIG. 27). After the extraction of binary numbers is completed, the characteristic points are deleted from the image data (step S1307) to recover an image data before adding the additional data. The deletion of characteristic points can be performed by replacing each characteristic point with a density of the pixels adjacent to the characteristic point. The extracted additional data is sent via the interface 137 to the bus B11 (step S1308), while the recovered image data is sent via the interface 136 to the bus B4 (step S1309). Then, the flow returns to step S1302.

Figure 26:
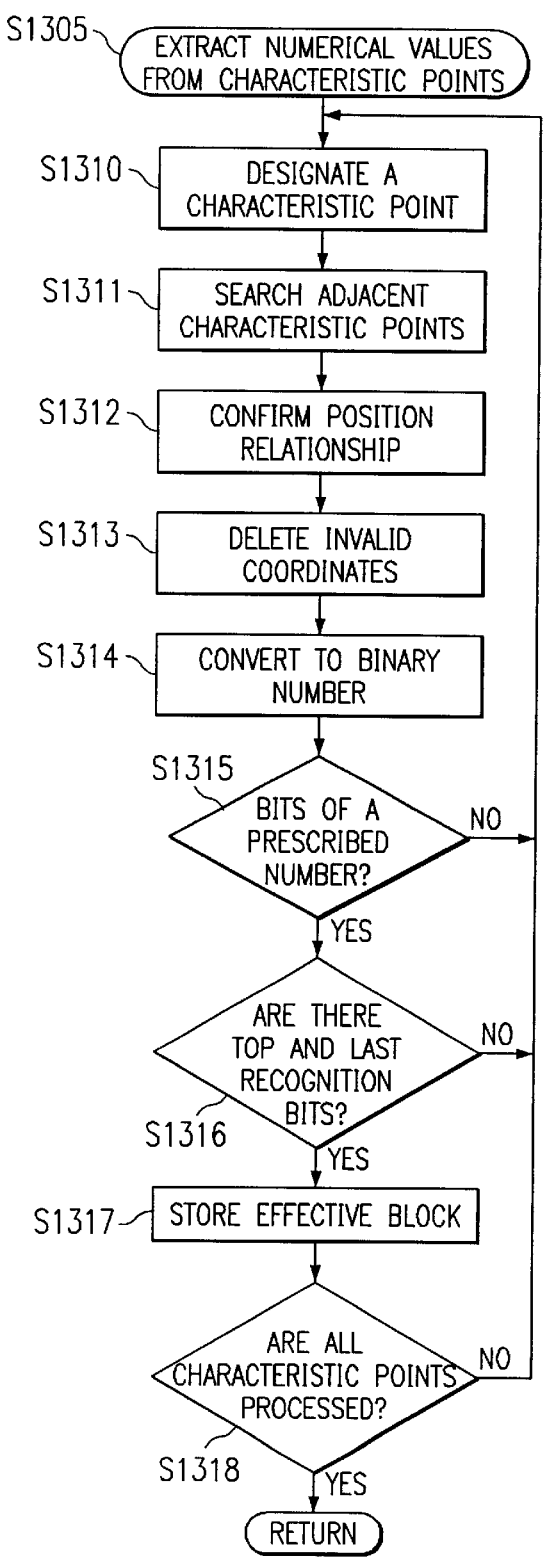
FIG. 26 is a flowchart for providing numerical data of characteristic points.

FIG. 26 shows a flow of the extraction of binary number (step S1305 in FIG. 25). The extraction of binary numbers from characteristic points is performed by judging the position relation of characteristic points. In this embodiment, a block of an additional data is embedded linearly within a predetermined range. The embedding may not necessarily be performed in a linear line and may be performed for example on an arc if the position relation is defined beforehand.

First, a characteristic point is designated (step S1310). Then, all the other characteristic points existing within the predetermined range are searched (step S1311). The maximum length of the predetermined range amounts to the length of a block (i.e. the bit length times the bit-to-bit distance). Next, it is confirmed if the coordinates of the characteristic points have the predetermined position relation (a linear line in this example) (step S1312), and invalid coordinates and data are deleted (step S1313). Then, the coordinates of the valid data of a block are converted to a binary number (step S1314). Next, if it is decided that the binary number has a prescribed number of bits (YES at step S1315) and that the binary number includes top and last recognition bits (YES at step S1316), the binary data is stored as a valid data (step S1317). The above-mentioned processing is repeated until all characteristic points are processed (YES at step S1318).

Figure 27:
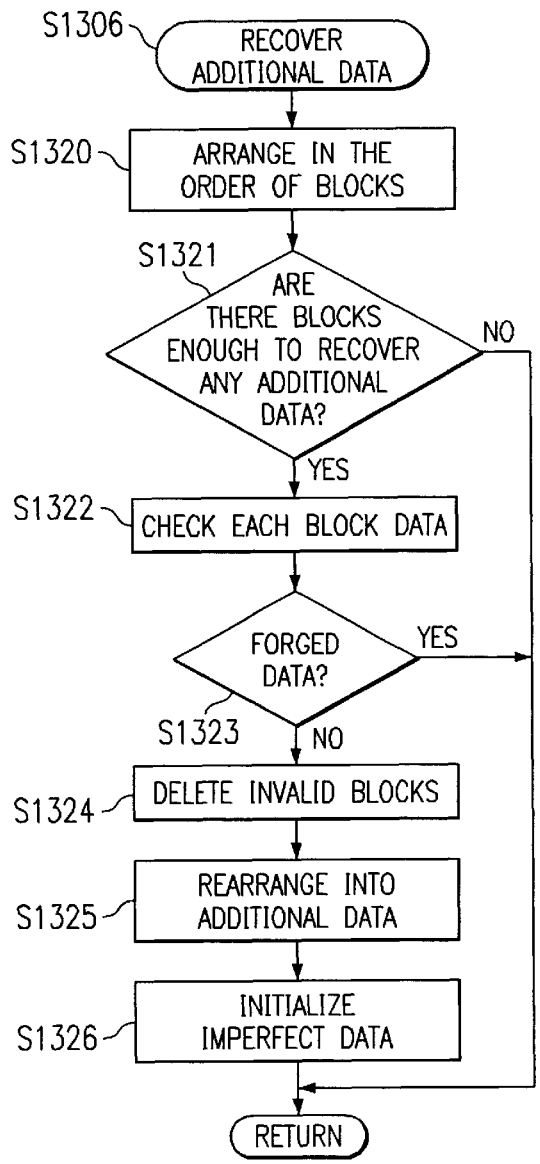
FIG. 27 is a flowchart of the recovery of additional data.

FIG. 27 shows a flow of the recovery of additional data (step S1306 in FIG. 25) wherein the data of the valid blocks obtained at step S1305 are converted to a binary data. First, the data of the valid blocks are arranged in a row in the order of block number included in the data (step S1320). Then if it is decided that blocks enough at least to recover an additional data are available (YES at S1323), the data of each block is checked (step S1322). In this embodiment, a plurality of sets of an additional data is embedded in a hard copy, and it is verified if the data of the same block number are the same with each other. If the data of the same block number are not the same, the data of the majority is adopted. If the data of the blocks cannot be determined by the majority decision, the data is made invalid. If the number of invalid blocks is more than a predetermined number (YES at step S1323), this means that the hard copy is a forged document made from a patchwork of a plurality of documents, and the flow returns readily to the main flow to report it to the additional data management section 18. If it is decided that the hard copy is not a forged document (NO at step S1323), the data of the invalid blocks are deleted (step S1324) and the data of the valid blocks are rearranged to recover an additional data (step S1325). Further, imperfect data having defects are initialized with predetermined values such as zeros or spaces(step S1326). The additional data recovered in this way are used by the main controller 7, the additional data management section 18 and the management unit 200, as will be explained later.

3-7 Drawing Section

As shown in FIG. 13, the drawing section 4 draws an image in the image memory 16 according to the character codes and figure codes received via the bus B3 from the packet analysis section 11 or the floppy disk analysis section 12. The structure and the drawing technique are similar to those for a bit map type printer controller. However, if the image to be drawn is a half-tone image, density bands assigned for block data are not used (refer FIG. 7).

3-8 Additional Data Management Section

The additional data management section 18 shown in FIG. 13 receives additional data via the bus B11 from the packet analysis section 11, the floppy disk analysis section 12, the image decision recovery section 13 and the operation unit 4, and compiles and manages the receive data for each source. As will be explained later, the compiled additional data is used to generate an additional data newly in a hard (copy processing (refer to step S739 in FIG. 33) carried out by the main controller 7, and the generated additional data is embedded in a hard copy (refer to steps S742 and D743 in FIG. 33).

FIG. 28 shows a structure of the additional data management section 18. A processor (CPU) 181 receives code data from the bus B11 through a code interface 182 and operation data via an operation data interface 184, and it makes a drawing section 183 embed an additional data in an image stored in the image memory 16 (FIG. 13). The processor 181 is controlled by the main controller 7. The processor 181 accesses directly the image memory 16 via the bus B1 when additional data of blocks designated by the operation unit 4 are searched by using an area not used in the image memory 16 as a work area. A counter 186 counts the area of a pattern by counting the number of pixels. An image comprises density data of a prescribed resolution, and the area is obtained for simplicity by counting the number of pixels having a density larger than a prescribed density. In order to improve the precision of the management, the areas of various density bands may be counted.

TABLE 2

Data received from various sources

| sender | source | intrinsic information |
|---|---|---|
| image reader | book | document name (e.g. book name) book code |
| image decision recovery section | document book | document name (e.g. book name) book code page number generation code copy code |

TABLE 2-continued

Data received from various sources

| sender | source | intrinsic information |
|---|---|---|
| packet analysis section | computer | password number rank of secret total pixel number forged document code data name (e.g. file name) page number |
| floppy disk analysis section | files of floppy disk | volume name file name page number |
| operation unit | values set by a user IC card | user name (user code) date number of copies password number apparatus recognition code |

Table 2 shows a part of additional data sent from various sources to the additional management section 18. The value of the rank of secret is increased with increasing degree of secret (for example 5 for the highest secrets). If the value is zero, it means an ordinary document which is not needed to be secret.

The additional data received by the additional data management section 18 are classified for each source as shown in Table 3. Usually, only one set of data on the source is embedded in a hard copy. However, a forged document made of a patch work of a plurality of documents may include a plurality of sets of data. In such a case, the additional data management section 18 manages the plurality of sets of data, while the same values are used for the data other than the source data.

TABLE 3

Classification of additional data

| Additional data | source data | name (e.g. document name, file name, data name) book code page number generation code* rank of secret password number forged document code total pixel number* copy code* |
|---|---|---|
| | copy conditions user data apparatus data | number of copies user name date apparatus recognition code |

NB. Marks "*" are updated for each copy.

Figure 33:
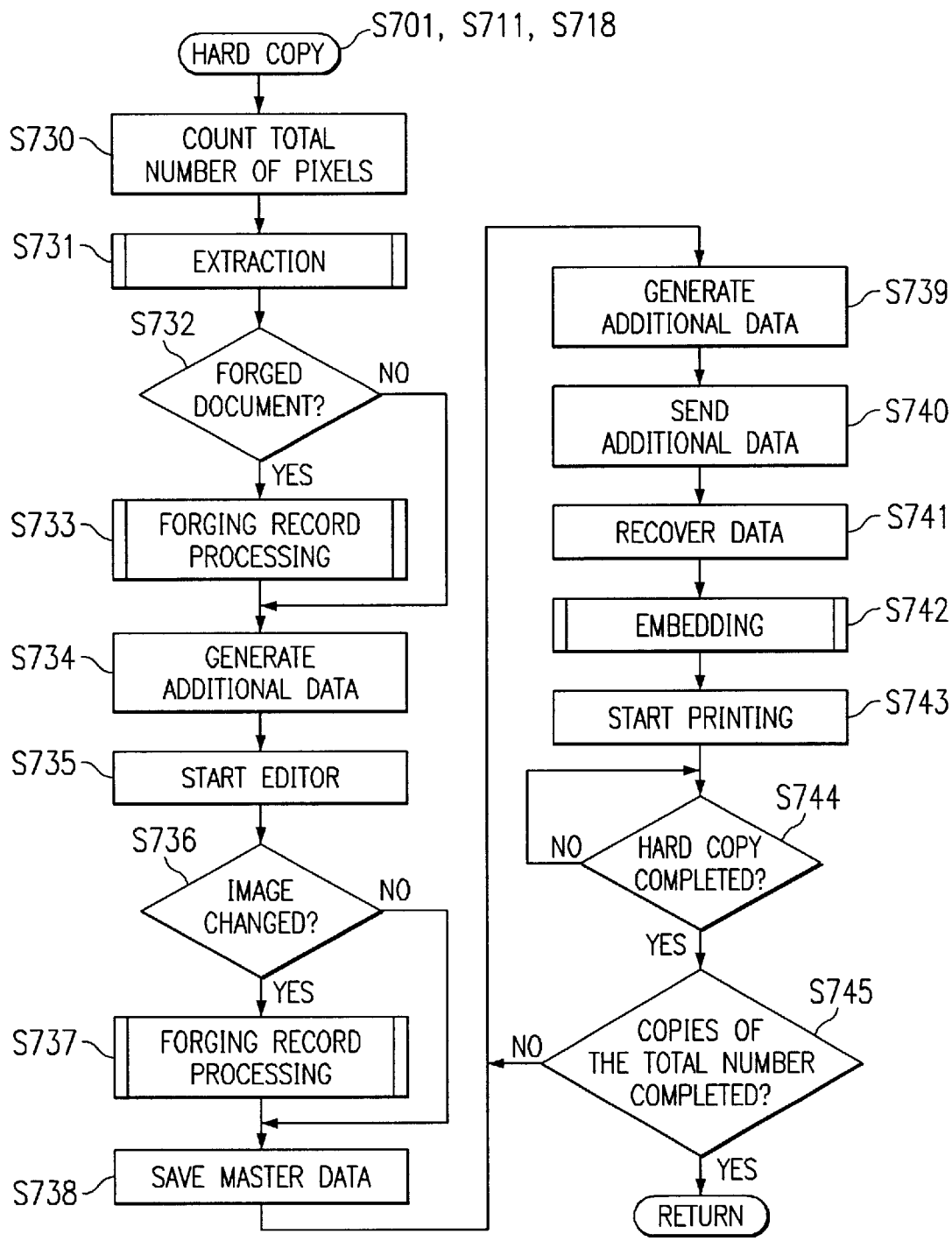
FIG. 33 is a flowchart of hard copy processing.

Next, it is explained how to generate a new additional data (refer step S739 in FIG. 33). A document name can be added by a user with the operation unit 4 or generated from the date and the user name, while a book code are stored in a code transmitter 3030 installed on forming a document. The data is fixed. The same data is transferred on copying.

A page number, a file name, a volume name and a data name are sent at the same time as the print data on printing from a word processor or a computer. The data is fixed. The volume name is received from the computer 102, while the data name is received from a floppy disk 104.

A generation code is added by the main controller 7 automatically on printing a hard copy. When a hard copy is produced newly, the generation is set to be one and the generation code is expressed as "1n" wherein the first digit "1" means the generation number and the last digit "n" means the sequential number of copies obtained from the same source. The generation number of a hard copy without an additional data is also set to be one. The generation code is increased for each copying of a new generation (refer FIG. 2.).

A copy code is generated successively in an image processor. It is not related to the additional data included in a document.

A password and a rank of secret are kept the same if included in a document. They are set by the operation unit 4 if not included in a document. A password once set cannot be changed.

A total pixel number is counted when the edition of an output image is completed. The pixels for the additional data included in a document are not counted.

A date when a hard copy is produced is set by using a calendar provided in the operation unit 4.

A user name and a user ID number are read from an IC card which is set by a user in the operation unit 4.

An apparatus recognition code is intrinsic for a printer and it is registered beforehand in the additional data management section 18. A hard copy produced with the same printer has the same apparatus recognition code.

A forged document code is kept the same if included in a document. It is added newly when it is decided to be a forged document By the main controller 7.

As explained above, each data included in an additional data can be generated and can be embedded in a hard copy. Therefore, by analyzing an additional data in a hard copy, a user name, a date, the number of copies can be obtained for each hard copy, and the analysis of the leakage path of a secret document becomes easy.

Figure 29:
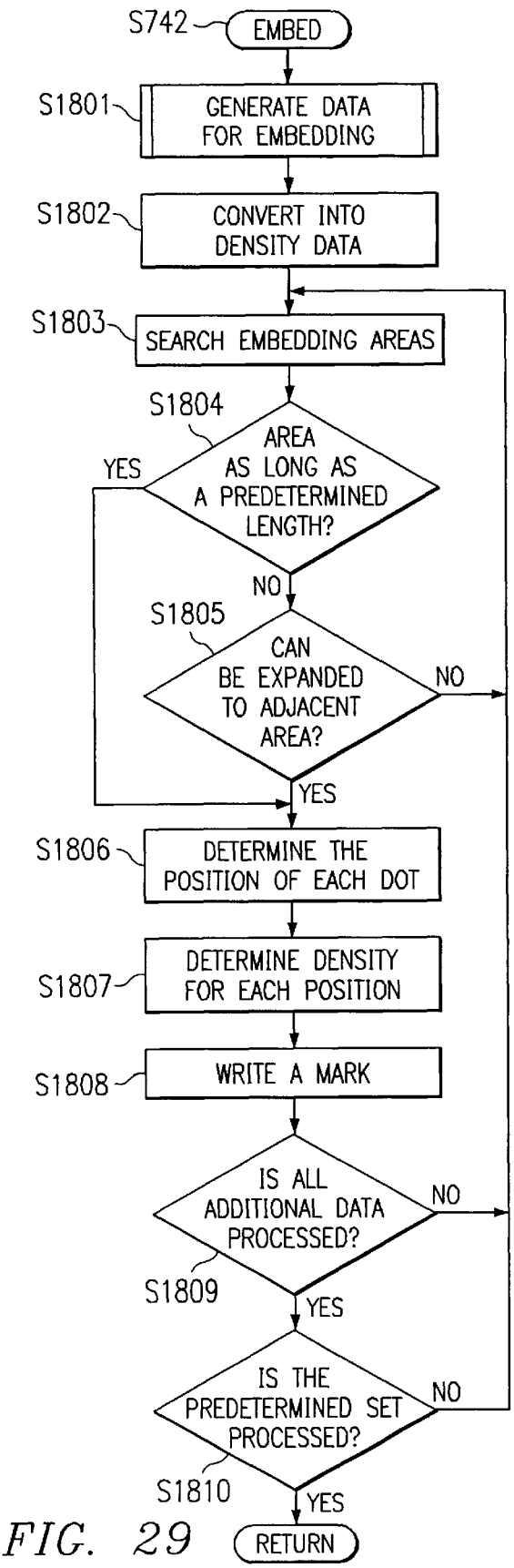
FIG. 29 is a flowchart for embedding a new additional data in the additional data management section.

FIG. 29 shows a flow of embedding an additional data (step S742 in FIG. 33) carried out by the additional management section 18 under the control of the main controller 7. First, block data of binary number are generated by dividing an additional data into blocks of a predetermined dot number added. with a block number (step S1801, refer FIG. 30). Next, in order to embed each block data in a hard copy as shown in FIGS. 7 and 8, the values of the block data are converted into signals of density data (step S1802). Then, areas for embedding the block data in a hard copy are searched (step S1803). Then, if an area as long as a predetermined length is decided to exist (YES at step S1804) or if an area is decided not so long as the predetermined length but it is decided to be extensible to an adjacent area because the density changes gradually (YES at step S1805), the positions of each dots are determined (step S1806), and the density values in a density block appropriate for the positions are determined for the positions (step S1807). Next, the block data determined above are written in the image data (step S1808). The above-mentioned processing is repeated until all additional data are processed (YES at step S1809). Further, the above-mentioned processing is repeated until a predetermined number of sets are embedded (YES at step S1810).

Figure 30:
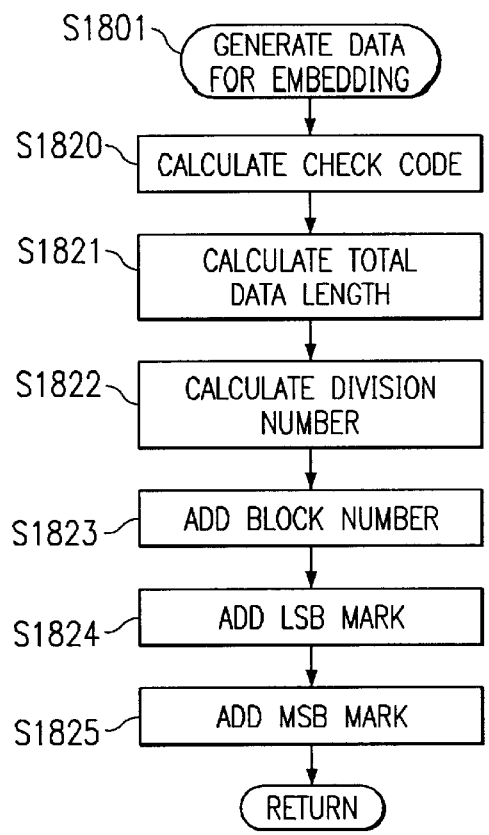
FIG. 30 is a flowchart of the generation of data to be embedded.

FIG. 30 shows a flow of the generation of data to be embedded (step S1801 in FIG. 29). First, check codes for making it possible to recover embedded block data and codes for error correction are calculated (step S1820), and the total data length of an additional data illustrated in FIG. 4 is calculated (step S1821). Further, the bit number for dividing the additional data into blocks is calculated and the number of blocks is calculated (step S1822). Further, a block number is added to each block data obtained by dividing the additional data (step S1823) and the mark LSB for designating the start of the block data and the mark MSB for designating the end of the block data are added (steps S1824 and S1825). Thus, a block data as shown in FIG. 6 can be generated.

3-9 Secret Management Section

When the additional data management section 18 detects a secret document having a rank of one or more, the secret management section 20 requests the operation unit 4 to input a password or if a book code is set in the additional data, a book code. If a password and a book code if necessary are received from the operation unit 4, the secret management section 20 compares them with the counterparts managed by the additional data management section 18, and sends the result to the operation unit 4. If the password and the book code received from the operation unit 4 are different from the counterparts in the additional data management section 18, the secret management section 20 prohibits the copying to prevent the illegal leakage of a secret document. The above-mentioned processing is carried out by the main controller 7 (refer to step S715 in FIG. 32).

3-10 Communication Management Section

The communication management section 5 transmits additional data compiled and managed by the additional data management section 18 via a telephone line to the management unit 200 each time an image data is received from a source or a hard copy is produced.

3-11 Main Controller

Figure 31:
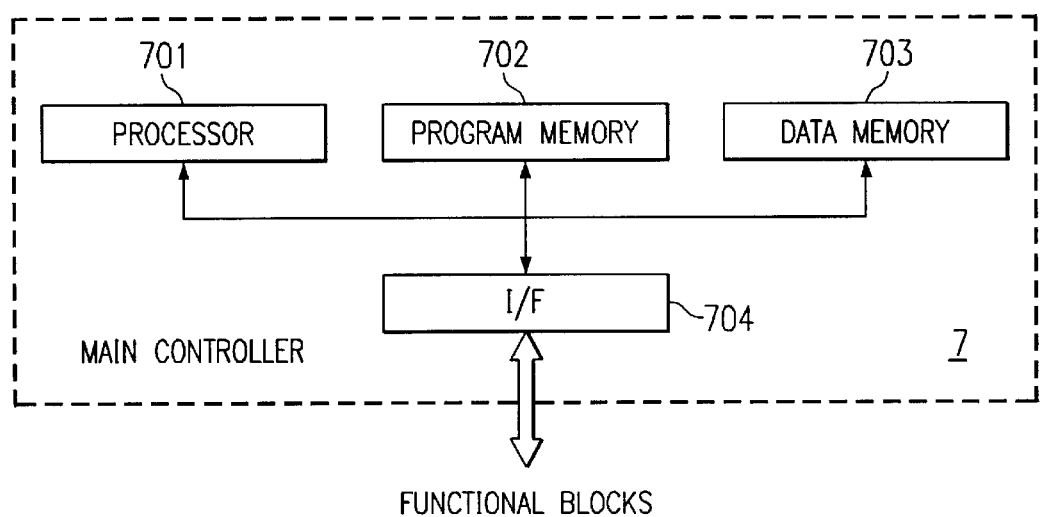
FIG. 31 is a block diagram of a main controller.

FIG. 31 shows a structure of the main controller 7 which carries out the read of image data from each source, the start of the packet analysis section 11, the floppy disk analysis section 12 and the image reader 3, and the sequence control of the hard copy processing and the secret management. The main controller 7 consists of a processor (CPU) 701, a program memory 702 storing a program run by the processor 701, a data memory 703, and an interface 704 with each function block in the image processor 100.

Figure 32:
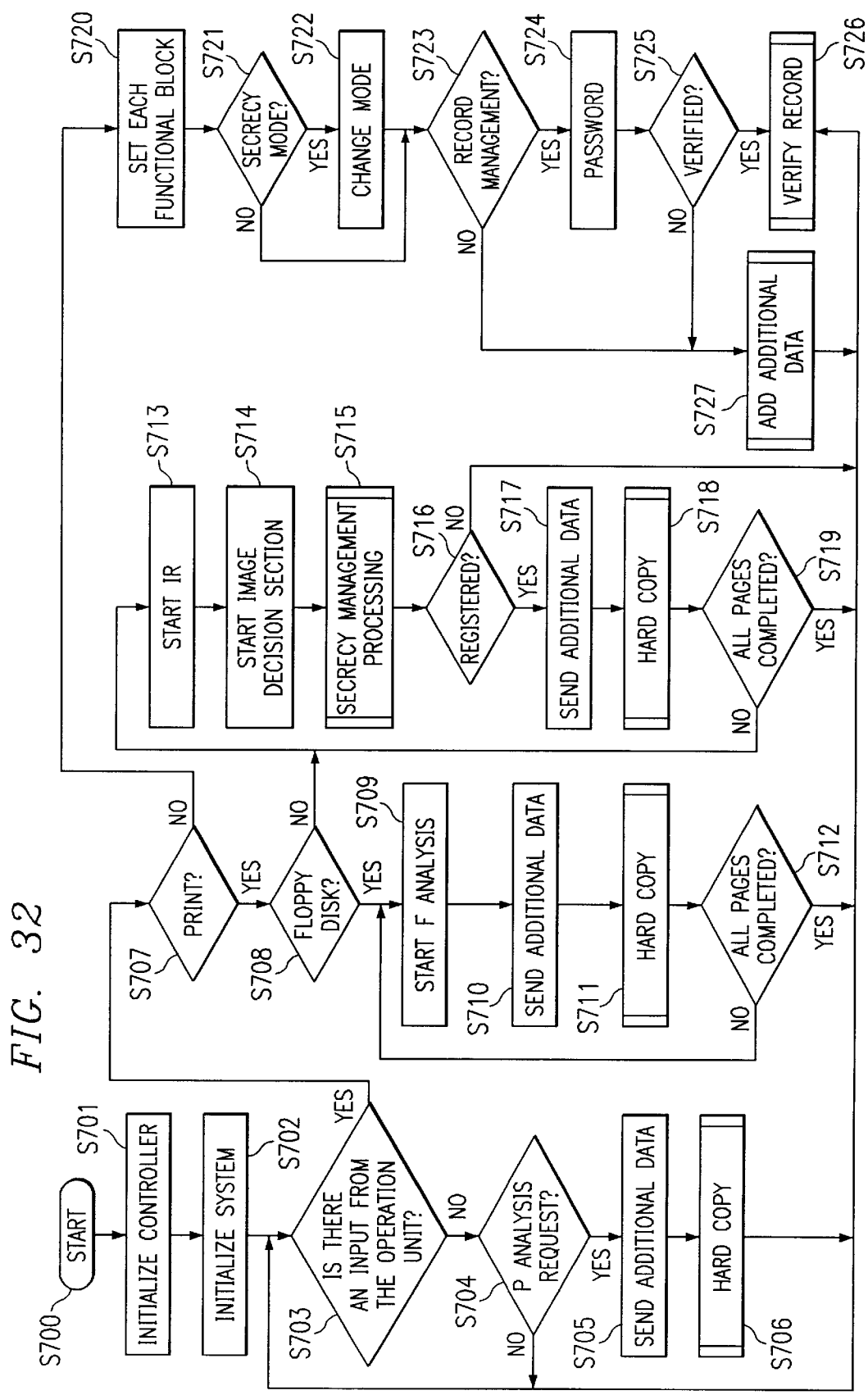
FIG. 32 is a flowchart of the processing of the main controller.

FIG. 32 shows a flow of the processor 701. First, the main controller 7 is initialized (step S701) and the initialization of the image processor 100 is commanded (step S702). The processing is started when a user inputs a request with the operation unit 4 (YES at step S703) or when the computer 102 sends a data (YES at step S704).

If the input from the computer 102 is an analysis request for the packet analysis section 11 (YES at step S704), it is waited that the completion of the processing is received from the packet analysis section 11. The packet analysis section 11 analyzes a page of data as explained above, and separates the additional data from the image data. Then, the packet analysis section 11 sends the image data to the drawing section 14 to draw an image in the image memory 16 while it sends the extracted additional data to the additional data management section 18. Finally, the packet analysis section 11 sends the completion of the processing to the main controller 7. Then, the main controller 7 makes the additional data management section 18 transmit the additional data to the management unit 200 (step S705), and it makes the output unit 6 print the image in the image memory 16 to output a hard copy (step S706, refer to FIG. 33). This processing is performed for each page of the data from the computer 102. Then, the flow returns to step S703.

If a print start is decided to be instructed with the operation unit 4 (YES at step S707), it is decided next if a floppy disk is set in the floppy disk drive 2 (step S708). If a floppy disk is decided to be set, a hard copy of a file stored in the floppy disk is requested to be produced so that the floppy disk analysis section 12 is activated (step S709). As explained above, the floppy disk analysis section 12 separates the additional data from the image data. Then, the floppy disk analysis section 12 sends the image data to the drawing section 14 to draw an image in the image memory 16 while it sends the extracted additional data to the additional data management section 18. Finally, the floppy disk analysis section 11 sends the completion of the processing to the main controller 7. After the completion of the processing of the floppy disk analysis section 12, the main controller 7 makes the additional data management section 18 transmit the additional data to the management unit 200 (step S710), and it makes the output unit 6 print the image in the image memory 16 to output a hard copy (step S711, refer to FIG. 33). A file in the floppy disk consists of a plurality of pages and these processing is performed in the unit of a page. If the processing of all pages is decided to be completed (YES at step S712), the flow returns to step S703.

If a floppy disk is decided not to be set, the image reader 3 is activated (step S713). Then, as explained above, the image reader 3 reads a document on the platen glass and reads a book code if the document is a book with a code transmitter. Then, the image decision recovery section 13 is activated (step S714). Then, as explained above, the image decision recovery section 13 checks the block data of an additional data embedded in a hard copy and recovers the additional data. Then, the image decision recovery section 13 sends the additional data to the additional data management section 18 and stores the recovered image data in the image memory 16. After the completion of the processing of the image decision recovery section 13, the main controller 7 performs the secrecy management (step S715, refer FIG. 36). If the document is decided not to be a secret document or if prescribed data including a password is inputted for a secret document (YES at step S716), the book code received by the additional data management section 18 and the additional data recovered by the image decision recovery section 13 are sent via the communication management unit 5 to the control unit 200 (step S717), and a hard copy is produced by sending the image data from the image memory 16 to the output unit 6 (step S718, refer FIG. 33). If a plurality of documents is set in the automatic document feeder 307, the above-mentioned processing is repeated until all pages are printed (YES at step S719). Then, the flow returns to step S703.

When a mode is set with the operation unit 4 (step S720), if a secrecy mode is decided to be set (YES at step S721), the mode is changed to the secrecy mode (step S722). If record management is instructed for managing the generation of hard copy and the sum of copy number (YES at step S723), a password is received (step S724), and if the password received is verified to agree with the registered password (YES at step S725), the record is verified next (S726, refer FIG. 37). If the record management is decided not to be instructed for the management (NO at step S723), a data is added to the additional data to be embedded in a hard copy (step S727, refer FIG. 38). Then, the flow returns to step S703.

FIG. 33 shows a flow of hard copy processing (steps S706, S711, S718 in FIG. 32). First, the area of a pattern of image drawn in the image memory 16 is measured (step S730). Though an image consists of density data of a predetermined resolution, the total number of pixels having a density larger than a predetermined value is counted as the area of a pattern for simplicity. Next, the extraction processing is performed for secret management (step S731, refer to FIG. 34).

Then, it is decided if the document is a forged document (step S732). In this decision, the total number of pixels set in the additional data is compared with that counted at step S730, and if the difference between them is larger than a predetermined number, the document is decided to be a forged document. Further, if the image decision recovery section 13 decides that the document is a forged document because a plurality of additional data is included, the document is decided to be a forged document. If the document is decided to be a forged document (YES at step S732), forging record processing is performed (step S733, refer to FIG. 35).

Next, the additional data is instructed to be displayed by the operation unit 4 (step S734). However, the password and the like are not displayed because they are secrets.

Then, the editor 17 is requested to edit the document image if the edition is instructed with the instruction unit 4 (step S735). If the document image is decided to be changed according to the edition (YES at step S736), it is decided that a part of the document is forged and the forging record processing is performed (step S737, refer to FIG. 35). Thus, the above-mentioned processing on forging is completed, and the master data are saved in the image memory 16 (step S738).

Next, a hard copy is produced. That is, the main controller 7 generates a new additional data by sending a command to the additional data management unit 18 (step S739), and sends the additional data to the management unit 200 (step S740). Then, the data saved in the image memory 16 is read again (step S741), and the additional data is embedded in the image data by the additional data management section 18 (step S742, refer to FIGS. 29 and 30), as explained above in detail. Next, the output unit 743 is activated (step S743). Thus, the image data is read from the image memory 16 synchronously with the output unit 6 for printing. After the completion of the hard copy (YES at step S744), if it is decided that hard copies of the predetermined total number is not completed (NO at step S745), the flow returns to step S739. The generation code and the copy code are updated for each hard copy. Further, as to the total number of pixels, the count on the image after the edition (step S735) is added.

Figure 34:
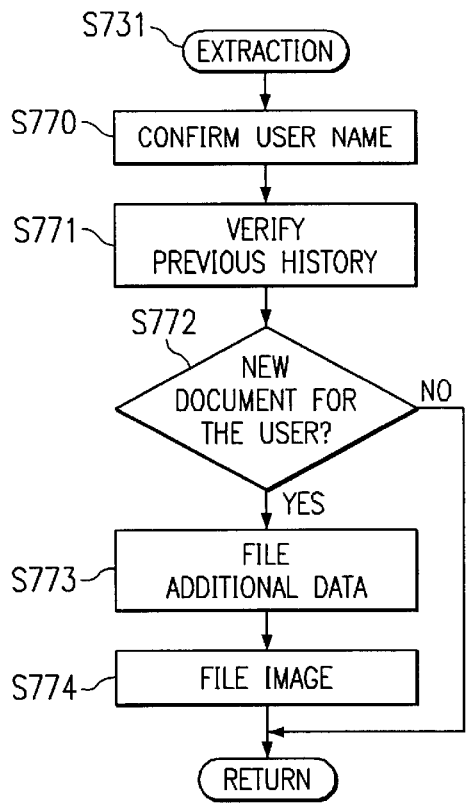
FIG. 34 is a flowchart of extraction processing.

FIG. 34 shows a flow of the extraction processing (step S731 in FIG. 33) for monitoring what is copied for each user. First, a user name is confirmed at the setting of an IC card and the like by the additional data management section 18 (step S770), and the additional data (stored in the additional management section 18) on the source to be printed is compared with the previous history of the user on the hard copies reproduced by the user stored in the filing unit 8 (step S771). If it is decided that the source under printing is determined to be a new source for the user (YES at step S772), the additional data and the image data are stored in the filing unit 8 (steps S773 and S774).

Figure 35:
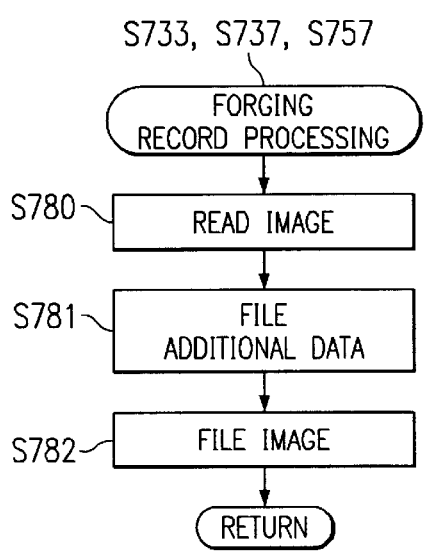
FIG. 35 is a flowchart of the processing of modified document.

FIG. 35 shows a flow of forging record processing (steps S733, S737 and S757 in FIG. 32). The image data decided to be a forged document is read (step S780), and the additional data and the image data are filed in the filing unit 8 (step S781 and S782).

Figure 36:
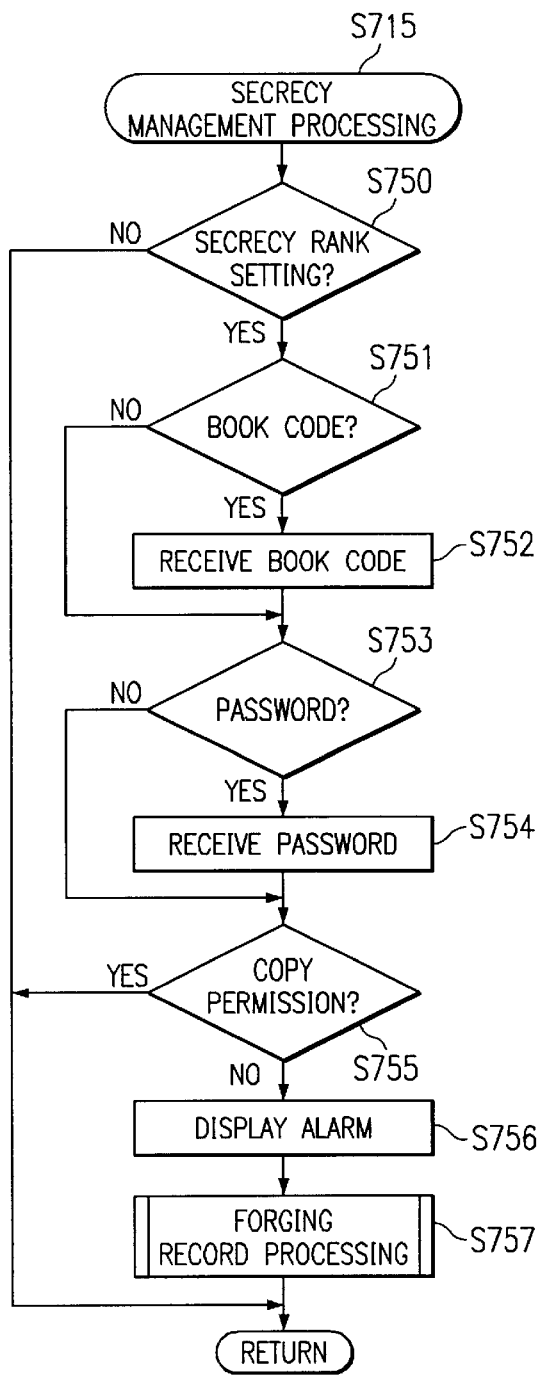
FIG. 36 is a flowchart of secret management processing.

FIG. 36 shows a flow of secrecy management processing (step S715 in FIG. 32). The main controller 7 activates the secret management section 20 to check the rank of secret (secrecy rank) included in the additional data of the source read by the additional data management unit 18. If the rank is decided to be one or more (YES at step S750), a confirmation data is requested to be received. That is, if a book code is decided to be set in the additional data (YES at step S751), a book code is received from the operation unit 4 (step S752). If a password is decided to be set in the additional data (YES at step S753), a password is received from the operation unit 4 (step S754). Then, the input book code or password is decided not to agree with the data set in the additional data (NO at step S755), an alarm message is displayed in the operation unit 6 (step S756), and the forging record processing is performed (step S757, refer to FIG. 35). Thus, the illegal copy of a secret document can be prevented effectively. On the other hand, for a document of the rank of secret of zero, a password or the like is not requested to be inputted, and the copying operation of an ordinary document is not interfered.

Figure 37:
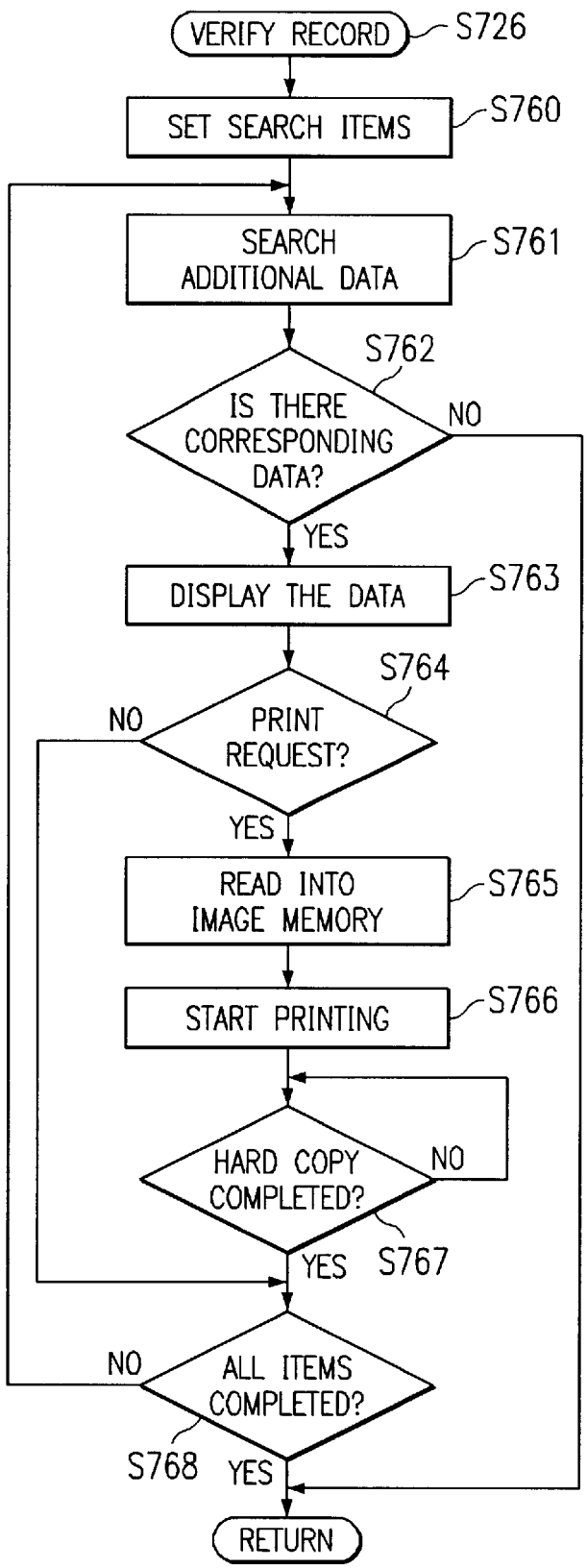
FIG. 37 is a flowchart of record management.

FIG. 37 shows a flow of the record verification processing (step S726 in FIG. 32) for verifying the history of a hard copy from the additional data such as the generation code or the copy code stored in the filing unit 8. An item in a record includes user names and the corresponding images filed in the filing unit 8 (step S731 in FIG. 34). When a user sets search items (step S760), additional data are searched (step S761). If there is decided to be a corresponding data (YES at step S762), the searched additional data is displayed in the operation unit 4 (step S763). Further, if a print is decided to be requested (YES at step S764), the additional data and the image data are stored in the image memory 16 (step S765), and the output unit 6 is activated to print the data (step S766). After the hard copy is decided to be completed (YES at step S767), if it is decided that the search of all items set at step S760 is not completed (NO at step S768), the flow returns to step S761. Thus, the analysis of leakage path becomes easy by using the additional data. Further, because forged or edited documents can also be examined, it is not needed to check a document itself to determine if the forging or edition is performed or not.

Figure 38:
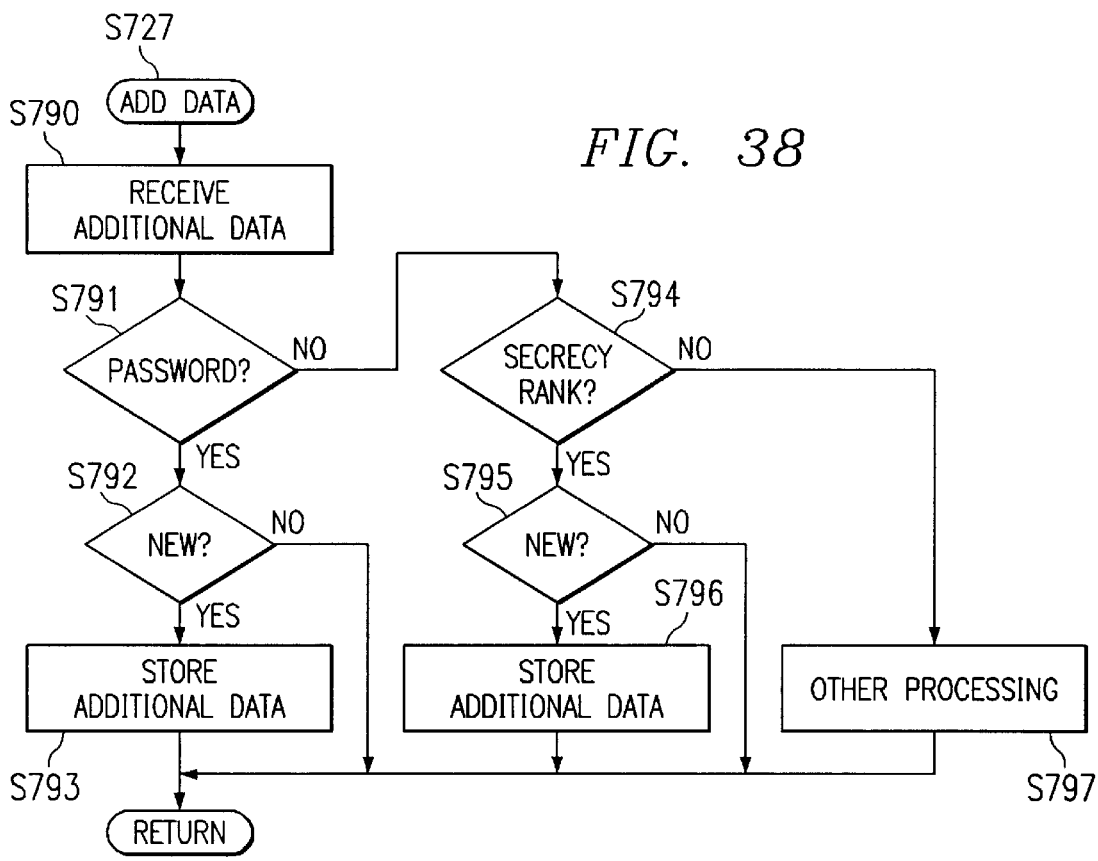
FIG. 38 is a flowchart of addition to additional data.

FIG. 38 shows a flow of the addition of additional data (step S727 in FIG. 32). When a data to be added is received (step S790), if it is decided to be a new password (YES at steps S791 and S792), the password is set in the additional data and it is stored in the additional data management section 18 (step S793). If the data is decided to be the rank of secret which is newly set (YES at steps S794 and S795), the data is added to the additional data and it is stored in the additional data management section 18 (step S796). Otherwise a different processing is performed (step S797).

(4) Management Unit 4-1 Structure of the Management Unit

Figure 39:
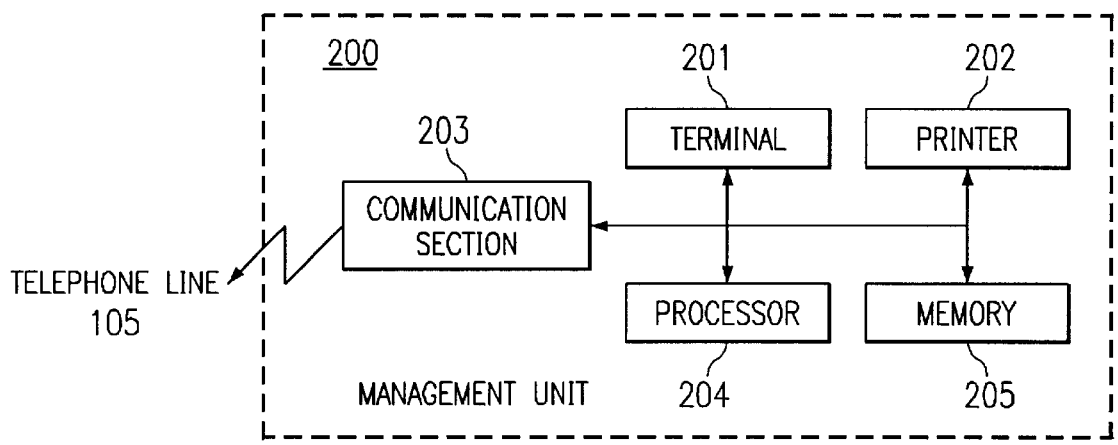
FIG. 39 is a block diagram of management unit.
Figure 40:
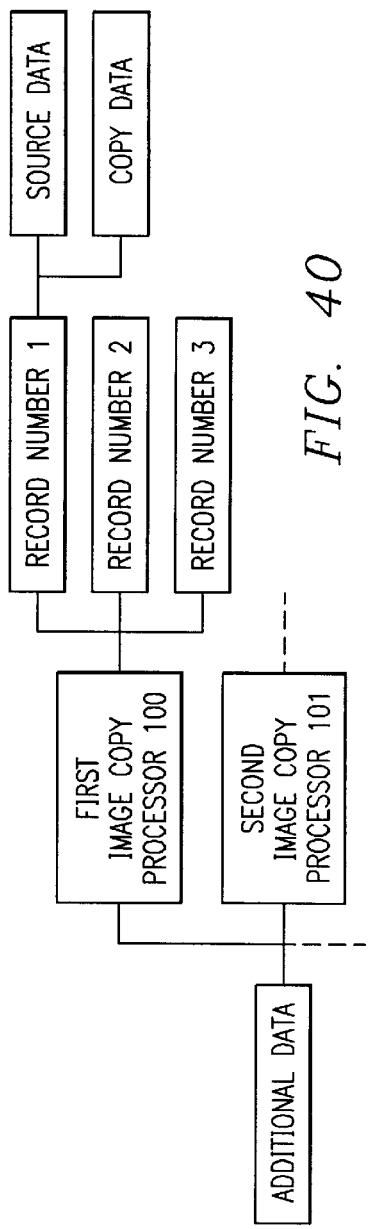
FIG. 40 is a diagram of the situation of additional data stored in the management unit.

FIG. 39 shows a block diagram of the management unit 200 which comprises a processor (CPU) 204 for controlling the management unit 200. A terminal 201 is used to operate the management unit 200 and to display various data and messages. A communication section 203 communicates via the telephone line 105 with the image processors 100, 101 to receive and send an additional data or the like. Usually a plurality of image processors 100, 101 are connected to the management unit 200. The data received by the communication unit 203 are the data on all hard copies processed by the image processors. All additional data received are stored in a memory 205 and the result of copy management can be printed with a printer 202. For example, the management unit 200 counts the total copy number of a specified document, confirms the leakage path of a specified document and searches a document of the rank of secret of one or more.

4-2 Format of Memory

The additional data received by the management unit 200 are stored in the memory 205 and managed systematically. First, an additional data is classified for each image processor, and each additional data for an image processor is stored as a record. Each record comprises an additional data embedded in a source and an additional data to be embedded in a hard copy. As compiled in Table 1, the additional data embedded in a source includes, for example, a document name, book code, page number, generation code, copy code, password number, rank of secret, total pixel number and forged document code.

4-3 Function of the Management Unit

Figure 41:
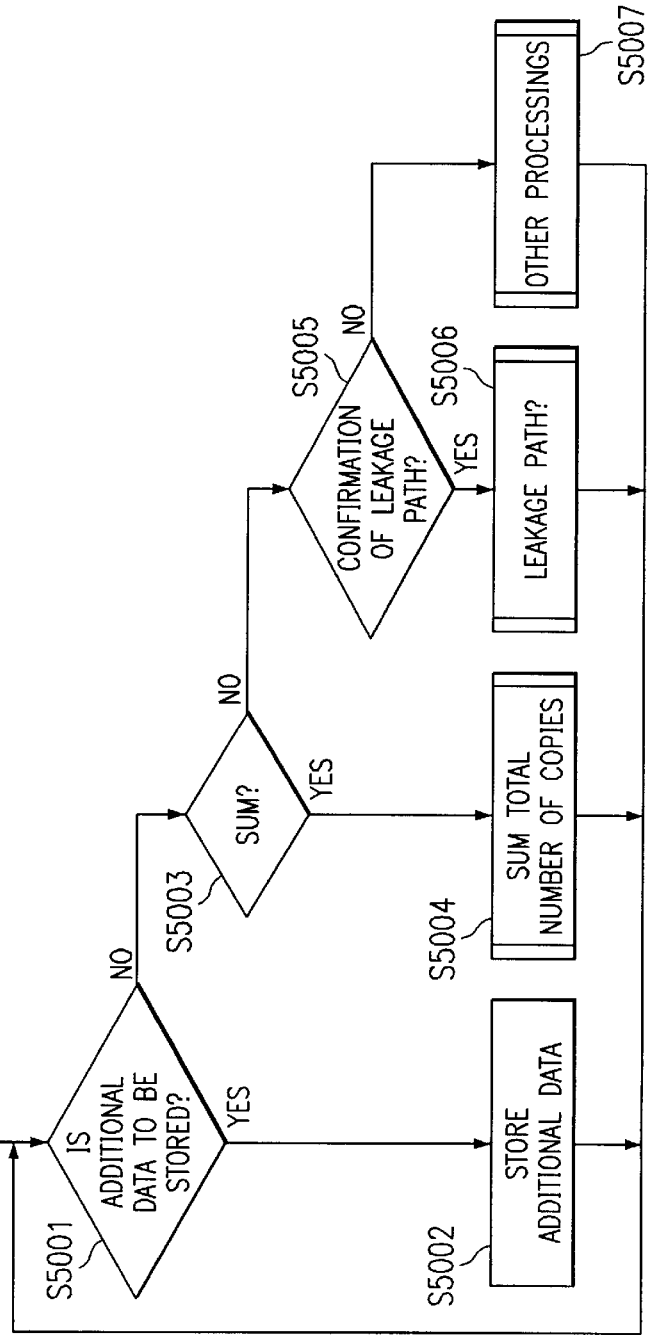
FIG. 41 is a flowchart of the processing of the management unit.

FIG. 41 shows a flow of the management unit 200. If an additional data is decided to be received from the additional data management section 18 or the secret management section 20 (YES at step S5001), the additional data is stored in the memory 205 (step S5002). If total copy number including generation copy is decided to be instructed with the terminal 201 (YES at step S5003), the total copy number is counted (step S5004, refer FIG. 42). That is, the copy number of a specified source can be determined from the records and it can be decided if the secret copy is leaked illegally or not by comparing it with the total number of hard copies recorded separately. If the confirmation of leakage path is decided to be instructed with the terminal 201 (YES at step S5005), the leakage path is confirmed (step S5006, refer FIG. 44). Otherwise if for example the detection of the hard copy of secret documents is instructed, the records for documents of the rank of secret of one or more are searched and the result is displayed at the operation unit 4 or printed at the output unit 6. Therefore, the situation of the copying of secret documents can be checked. If necessary, the name of source, a user name and the like can be detected.

Figure 42:
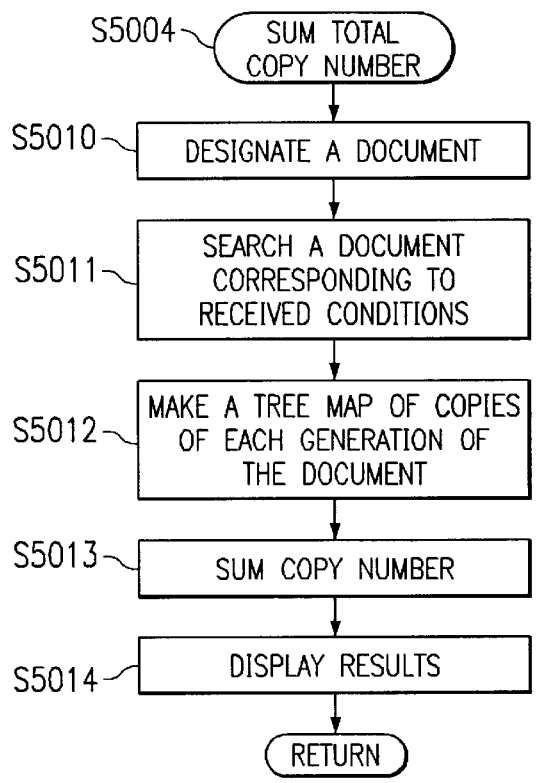
FIG. 42 is a flowchart of the summation of total copies.

FIG. 42 shows a flow of the summation of total copy number (step S5004 in FIG. 41). First, a source to be summed is designated with the terminal 201 (step S5010). Usually, a document name, a book code or a page number is inputted. Then, all records on the specified source are searched in the memory 205 (step S5011). Next, the generation of the records is analyzed and a tree map of copy numbers in each generation is produced (step S5012). Usually, a tree map corresponds with the generation code. However, if there is a plurality of sources of the same document name, copy code is used instead of generation code. Next, the copy number is summed (step S5013). If there is a plurality of tree maps, the sum is obtained for each tree map. Then, the results are displayed at the terminal 201 and are printed if necessary (step S5014).

Figure 43:
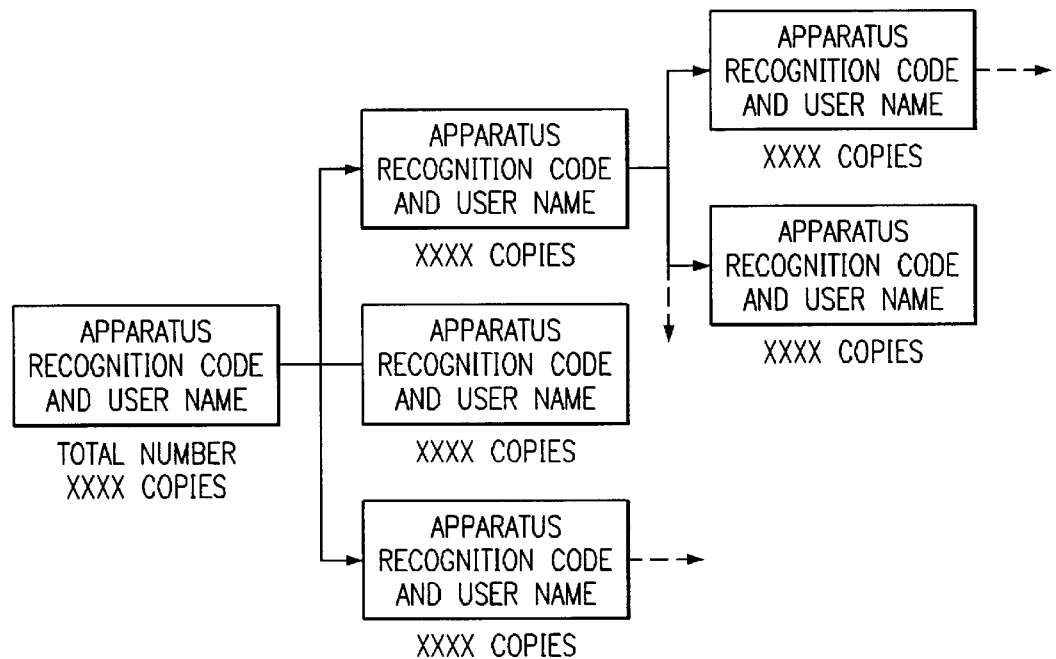
FIG. 43 is a diagram of the result of the summation displayed in the operational section or printed by the output section.

FIG. 43 shows an example of a tree map obtained at step S5004. The hard copies obtained from the same original document are classified. At each generation, the apparatus recognition code and a user name are shown with a sum of the number of hard copies as well as the total sum thereof.

Figure 44:
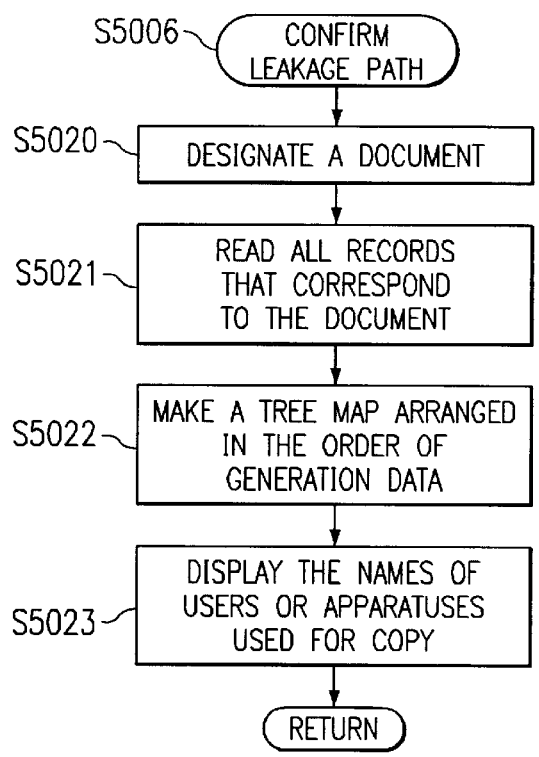
FIG. 44 is a flowchart of examination of flow path.

FIG. 44 shows a flow of the confirmation of leakage path (step S5006 in FIG. 42). First, a source to be summed is designated with the terminal 201 (step S5020). Usually, a document name, a book code or a page number is inputted. Then, all records on the specified source are searched in the memory 205 (step 55021). Next, the generation of the records is analyzed and a tree map of the records at each generation is produced (step S5022). Usually, a tree map is generated with respect to the generation code. However, if there is a plurality of sources of the same document name, the copy code is used instead of the generation code. Next, the obtained tree map is displayed at the terminal 201 and is printed if necessary (step S5023).

Figure 45:
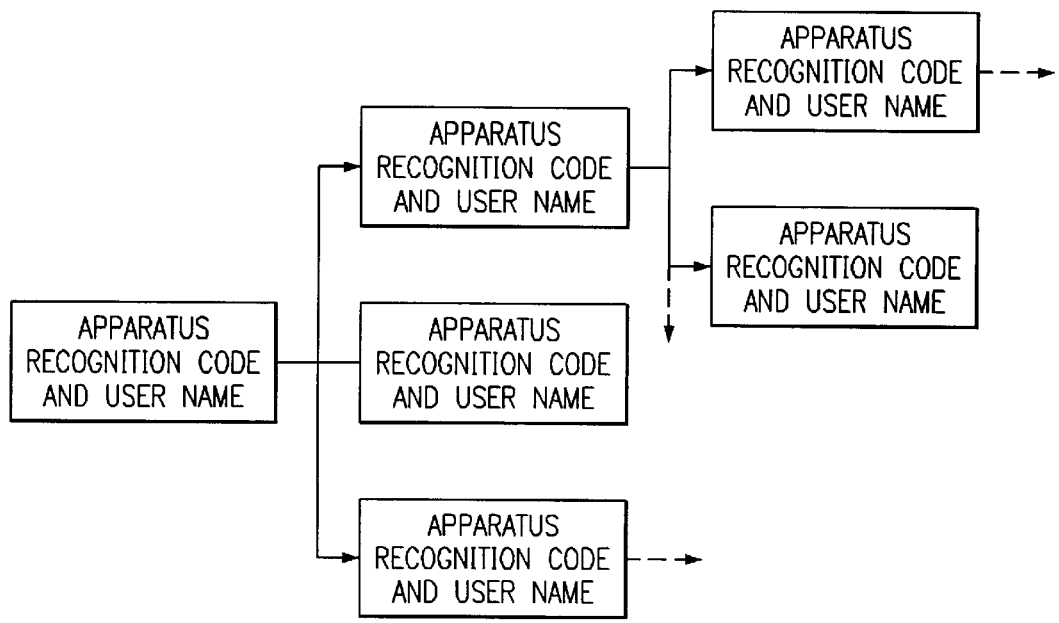
FIG. 45 is a diagram of an example of the result of the examination of flow path.

FIG. 45 shows an example of a tree map obtained at step S5006. The hard copies obtained from the same original document are classified. At each generation, the apparatus recognition code and a user name are shown.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image forming apparatus comprising:
   an input device for inputting image data;
   an extracting device for extracting additional data embedded in input image data; and
   an analyzer for analyzing a distribution path from original image data, which corresponds to such input image data, to the input image data by said input device based on that additional data extracted by said extracting device.

2. An apparatus according to claim 1, wherein additional data have a plurality of kinds of information, and said analyzer is adapted to make an analysis based on the plurality of kinds of information in additional data extracted by said extracting device.

3. An image forming apparatus comprising:
   an input device to input image data;
   an extracting device to extract additional data embedded in input image data inputted by said input device; and
   an embedding device to prepare new additional data, based on additional data extracted by said extracting device, and to embed the new additional data in image data inputted by said input device.

4. An image forming apparatus comprising:
   an input device to input first image data;
   a search means to search for an area to embed additional data in image data inputted by said input device; and
   an embedding device to change density levels of pixels of image data included in an area searched by said search means, in a manner representative of additional data to be embedded, and to embed the additional data in the image data inputted by said input device.

5. An image forming apparatus, comprising:
   an input device for inputting image data;
   an embedding device to embed at least first additional data and second additional data in image data inputted by said input device,
   wherein the first additional data and the second additional data are the same,
   wherein the embedding device is adapted to synthesize the first and second additional data and the image data inputted by said input device such that an output image data provided by the embedding device includes the image data, at least a first pixel group and at least a second pixel group within the input image data, the first and second pixel groups having a predetermined pattern and having selected ones of the pixels in each pixel group altered or unaltered, wherein at least one pixel in the first pixel group represents a binary digit of the first additional data indicated by whether the one pixel in the fires pixel group is altered or unaltered and at least one pixel in the second pixel group represents a binary digit of the second additional data indicated by whether the one pixel in the second pixel group is altered or unaltered,
   wherein the output image is substantively identical visually to an image representative of image data inputted by said input device; and
   wherein in the output image the first additional data assumes a first orientation and the second additional data assumes a second orientation, and said first orientation and said second orientation are different.

6. An apparatus according to claim 5, wherein the embedding device is adapted to embed the first additional data at a first position in a reproduced image representative of the image data including the first additional data and the second additional data and to embed the second additional data at a second position in such reproduced image, and the first position differs from the second position.

7. An image forming apparatus according to claim 5, wherein each pixel of the first and second pixel groups corresponds to a pixel of the image data.

8. An image forming apparatus, comprising:
an input device for inputting image data; and
an embedding device to embed additional data in image data inputted by said input device,
wherein the additional data are a plurality of predefined, discontinuous data units, and each data unit includes at least one indicator that establishes a predefined relationship with respect to at least one other data unit, and
wherein at least a portion of said plurality of data units are combinable, based on said predefined relationship, to form a single set of information.

9. An image processing apparatus comprising:
an extracting device for extracting additional data embedded in inputted image data; and
an analyzer for analyzing a distribution path from original image data, which corresponds to such input image data, to the inputted image data based on extracted additional data.

10. An apparatus according to claim 9, wherein additional data have a plurality of kinds of information, and said analyzer is adapted to make an analysis based on the plurality of kinds of information in additional data extracted by said extracting device.

11. An image processing apparatus comprising:
an extracting device to extract additional data embedded in inputted image data; and
an embedding device to prepare new additional data, based on extracted additional data, and to embed the new additional data in inputted image data.

12. An image processing apparatus comprising:
search means to search for an area to embed additional data in input image data; and
an embedding device to change density levels of pixels of image data included in an area searched by said search means, in a manner representative of additional data to be embedded, and to embed the additional data in the input image data.

13. An image processing apparatus comprising:
an input device for inputting image data; and
an embedding device to embed additional data in image data inputted by said input device,
wherein the embedding device is adapted to embed the additional data within the image data inputted by said input device such that an output image data provided by the embedding device includes the image data and at least one pixel group within the image data, the one pixel group having a predetermined pattern and having selected ones of the pixels in the one pixel group altered or unaltered, wherein at least one pixel in the one pixel group represents a binary digit of the additional data indicated by whether the one pixel is altered or unaltered, and
wherein the output image data including the additional data is substantively identical visually to an image representative of image data inputted by said input device.

14. An apparatus according to claim 13, wherein the embedding device is adapted to embed the first additional data at a first position in said reproduced image representative of the image data including the first additional data and the second additional data and to embed the second additional data at a second position in such reproduced image, and the first position differs from the second position.

15. An image forming apparatus according to claim 14, wherein each pixel of the at least one pixel group corresponds to a pixel of the image data.

16. An image processing apparatus comprising:
an input device for inputting image data; and
an embedding device to embed additional data in image data inputted by said input device,
wherein the additional data are a plurality of predefined, discontinuous data units, and each data unit includes at least one indicator that establishes a predefined relationship with respect to at least one other data unit, and
wherein at least a portion of said plurality of data units are combinable, based on said predefined relationship, to form a single set of information.

17. A data processing apparatus comprising:
an extracting device for extracting embedded additional data in inputted data; and
an analyzer for analyzing a distribution path from original data, which corresponds to such input data, to the inputted data,
wherein the distribution path is derived from extracted additional data.

18. A data processing apparatus comprising:
an extracting device to extract embedded additional data in inputted data; and
an embedding device to prepare new additional data, based on extracted additional data, and to embed the new additional data in inputted data.

19. A data processing apparatus comprising:
search means to search for an area to embed additional data in input data; and
an embedding device to change a prescribed characteristic level included in an area searched by said search means, in a manner representative of additional data to be embedded, and to embed the additional data in the input data.

20. A data processing apparatus comprising:
an input device for inputting data; and
an embedding device to embed additional data in data inputted by said input device,
wherein the additional data are a plurality of predefined, discontinuous data units, and each data unit includes at least one indicator that establishes a predefined relationship with respect to at least one other data unit, and
wherein at least a portion of said plurality of data units are combinable, based on said predefined relationship, to form a single set of information.

21. A method of processing data so as to embed additional data in image data comprising the steps of:
inputting image data;
extracting additional data embedded in inputted image data; and
analyzing a distribution path from original image data, which corresponds to such inputted image data, to the inputted image data based on extracted additional data.

22. A method of processing data so as to embed additional data in image data comprising the steps of:

inputting image data;

extracting additional data embedded in inputted image data; and preparing new additional data, based on extracted additional data, and embedding the new additional data in said inputted image data.

23. A method of processing data so as to embed additional data in image data comprising the steps of:

inputting first image data;

searching inputted first image data for an area to embed additional data; and changing density levels of pixels of the inputted first image data included in a searched area, in a manner representative of additional data to be embedded, so as to embed the additional data in the inputted first image data.

24. A method of processing data so as to embed additional data in image data comprising the steps of:

inputting image data; and embedding additional data in inputted image data, wherein the additional data are a plurality of predefined, discontinuous data units, and each data unit includes at least one indicator that establishes a predefined relationship with respect to at least one other data unit, and wherein at least a portion of said plurality of data units are combinable, based on said predefined relationship, to form a single set of information.

25. An image processing apparatus comprising:

an input device to input image data;

an extracting device to extract additional data embedded in input image data;

a generator to generate new additional data, wherein the new additional data has a relationship with extracted additional data; and an embedding device to embed new additional data in input image data.

26. An image processing method comprising the steps of:

inputting image data;

extracting additional data embedded in input image data;

generating new additional data having a relationship to extracted additional data; and embedding new additional data in input image data.

* * * * *

UNITED STATES PATENT AND TRADEMARK OFFICE
CERTIFICATE OF CORRECTION

| | |
|---|---|
| PATENT NO. | : 6,738,491 B1 |
| APPLICATION NO. | : 08/911101 |
| DATED | : May 18, 2004 |
| INVENTOR(S) | : Yoshikazu Ikenoue et al. |

It is certified that error appears in the above-identified patent and that said Letters Patent is hereby corrected as shown below:

Title page,
Item [57], ABSTRACT,
Line 12, after "data", delete ",".

Column 1,
Lines 6 and 7, delete "No.08/ 327,223", and insert -- No. 08/327,223 --.
Line 17, delete "copy.", and insert -- copying. --.
Line 19, delete "are", and insert -- have been --.
Line 20, delete "copy right", and insert -- copyrights --.
Line 25, after "generation", delete "of".
Line 33, after "easy", insert -- to produce --.
Line 43, delete "moneys", and insert -- money --.

Column 2,
Line 35, delete "an".
Lines 42 and 43, delete "with naked eyes", and insert -- with the naked eye --.
Line 48, after "disk", delete ",", and insert -- . --.
Lines 49 and 60, delete "an".
Line 52, after "includes", delete "an".

Column 3,
Lines 7, 14 and 44 delete "an".
Line 20, delete the second instance of "an", and insert -- a --.

Column 4,
Line 36, after "embedding", delete "a".

Column 5,
Line 25, after "produced,", delete "a".
Lines 26 and 53, delete "an".
Line 28, delete "with naked eyes", and insert -- with the naked eye --.

Column 6,
Line 2, delete "An additional", and insert -- Additional --.
Line 4, delete "an".
Line 29, after "add", delete "an".
Line 34, after "is", delete "a".
Line 43, after "source,", delete "a".
Lines 59 and 60, delete "(refer FIG. 2)," and insert -- (refer to FIG. 2), --.

UNITED STATES PATENT AND TRADEMARK OFFICE
CERTIFICATE OF CORRECTION

PATENT NO. : 6,738,491 B1
APPLICATION NO. : 08/911101
DATED : May 18, 2004
INVENTOR(S) : Yoshikazu Ikenoue et al.

It is certified that error appears in the above-identified patent and that said Letters Patent is hereby corrected as shown below:

Column 7,
Line 6, delete "An additional data is a digital data", and insert -- Additional data is digital data --.
Line 8, after "of", delete "an".
Line 11, delete "An additional data is expressed as a continuous data", and insert -- Additional data is expressed as continuous data --.
Line 13, delete "data-can", and insert -- data can --.
Line 22, after "is", delete "a".
Line 22, after "and", delete "a".
Line 26, after "of", delete "an".
Lines 28, 31, 36, 39, 45 and 59, delete "an".
Line 30, delete both instances of "a".
Line 62, delete both instances of "an".
Line 64, delete "each".
Line 64, after "copy,", delete "a".

Column 8,
Lines 2 and 3, delete "a".
Line 6, delete "different a little", and insert -- a little different --.
Line 10, delete "A block", and insert -- Block --.
Lines 16, 24, 31, 33, 38, 47, 50, 53, 56 and 63, delete "an".
Line 26, after "oval.", delete "a".
Line 32, delete "with naked eyes", and insert -- with the naked eye --.
Line 44, after the first instance of "a", delete ".".
Line 49, delete "is", and insert -- are --.
Line 54, delete the second instance of "an".

Column 9,
Line 6, delete "A long", and insert -- Long --.
Line 9, after "as", delete "a".
Lines 10, 13, 54, 55 and 57, delete "an".
Line 22, delete "was".
Line 24, delete "how much was".
Line 25, after "document", insert -- , --.
Line 34, delete "is omitted to be displayed", and insert -- are not displayed --.
Line 61, after "embeds", delete "a".

Column 10,
Line 4, delete the first instance of "a".
Lines 8 and 34, delete "an".
Line 39, delete "copy right", and insert -- copyright --.

UNITED STATES PATENT AND TRADEMARK OFFICE
CERTIFICATE OF CORRECTION

PATENT NO. : 6,738,491 B1
APPLICATION NO. : 08/911101
DATED : May 18, 2004
INVENTOR(S) : Yoshikazu Ikenoue et al.

It is certified that error appears in the above-identified patent and that said Letters Patent is hereby corrected as shown below:

Column 10 (cont'd),
Line 52, delete "plays roles", and insert -- act --.
Line 54, delete "A code", and insert -- Code --.

Column 11,
Line 16, delete "is", and insert -- has --.
Line 39, delete "an".
Line 59, delete both instances of "an".
Line 62, delete both instances of "a".
Line 67, delete the first instance of "an".

Column 12,
Line 7, delete "an image data is waited", and insert -- image data waits --.
Lines 9 and 10, delete "When an image data is received, the data is analyzed. That is", and insert -- When image data is received, the data is analyzed, that is, --.
Lines 12, 32 and 48, delete both instances of "a".
Lines 14, 45, 51 and 59, delete "an".
Line 28, delete both instances of "an".
Line 36, delete the first instance of "an".
Line 43, delete "an image data is waited to be received", and insert -- image data waits to be received --.
Line 59, delete "a".

Column 13,
Lines 3, 6, 17, 20, 32 and 59, delete "an".
Lines 24, 25 and 50, delete "is", and insert -- are --.
Lines 51 and 56, delete "a".
Line 59, delete "that blocks enough", and insert -- that there are enough blocks --.
Line 62, delete "sets of an additional data is", and insert -- sets of additional data are --.

Column 14,
Line 2, delete "this", and insert -- it --.
Lines 9 and 31, delete "an".
Line 11, delete "spaces(step S1326) , and insert -- spaces (step S1326) --.
Line 29, delete "receive", and insert -- received --.
Lines 31 and 34, delete "is", and insert -- are --.
Line 32, delete "(copy", and insert -- copy --.
Line 40, delete the first instance of "an".

UNITED STATES PATENT AND TRADEMARK OFFICE
CERTIFICATE OF CORRECTION

| | | |
|---|---|---|
| PATENT NO. | : 6,738,491 B1 | |
| APPLICATION NO. | : 08/911101 | |
| DATED | : May 18, 2004 | |
| INVENTOR(S) | : Yoshikazu Ikenoue et al. | |

It is certified that error appears in the above-identified patent and that said Letters Patent is hereby corrected as shown below:

Column 15,
Line 57, delete "a".
Line 60, delete "are", and insert -- is --.
Line 62, delete both instances of "is", and for both instances insert -- are --.
Line 63, delete "a data" and insert -- data --.

Column 16,
Line 3, delete "produced newly", and insert -- newly produced --.
Lines 8, 34, 38 and 42, delete "an".
Line 14, delete "secret", and insert -- secrecy --.
Lines 30 and 31, delete "It is added newly when it is decided to be a forged document By the main controller 7", and insert -- It is newly added when decided it is a forged document by the main controller 7 --.
Line 32, delete "each", and insert -- all --.
Line 32, delete "and", and insert -- the --.
Line 43, after "added", delete ".".
Line 44, delete "each", and insert -- all of the --.
Line 53, delete "dots", and insert -- dot --.
Line 66, delete "an" and insert -- the --.

Column 17,
Lines 7 and 46, delete "a".
Line 29, delete "an".
Line 62, delete "(copy", and insert -- copy --.

Column 18,
Line 17, delete "these processing is performed", and insert -- these processes are performed --.
Line 18, delete "is decided".
Line 26, delete "an".
Line 50, delete "number", and insert -- numbers --.
Line 56, delete "a".

Column 19,
Lines 8, 12, 33 and 37, delete "is", and insert -- are --.
Line 14, delete "secrets", and insert -- secret --.
Line 25, delete the first instance of "a".
Line 63, delete "a".
Line 64, delete the first instance of "is", and insert -- are --.

UNITED STATES PATENT AND TRADEMARK OFFICE
CERTIFICATE OF CORRECTION

PATENT NO. : 6,738,491 B1
APPLICATION NO. : 08/911101
DATED : May 18, 2004
INVENTOR(S) : Yoshikazu Ikenoue et al.

It is certified that error appears in the above-identified patent and that said Letters Patent is hereby corrected as shown below:

Column 20,
Line 7, delete "copy", and insert -- copying --.
Line 11, after "interfered", insert -- with --.
Lines 14 and 15, delete "An item in a record includes", and insert -- Items in a record include --.
Lines 18 and 33, delete "a".
Line 19, delete "is", and insert -- are --.
Line 37, delete "is", and insert -- has been --.
Lines 38 and 60, delete "secret", and insert -- secrecy --.
Line 39, delete the first instance of "is", and insert -- are --.
Line 39, delete "it".
Line 41, delete "processing", and insert -- process --.
Lines 51, 65 and 67, delete "an".
Line 66, delete "each", and insert -- all --.
Line 67, delete "is" and insert -- are --.

Column 21,
Lines 1 and 8, delete "an".
Line 5, delete "secret", and insert -- secrecy --.
Line 11, delete "is", and insert -- are --.
Line 39, after "name,", insert -- a --.
Line 39, after "of", insert -- a --.
Line 58, delete "is", and insert -- are --.

Column 22,
Line 58, delete "fires", and insert -- first --.

Signed and Sealed this

Seventh Day of August, 2007

JON W. DUDAS
*Director of the United States Patent and Trademark Office*